United States Patent
Shinoki

(10) Patent No.: US 12,512,495 B2
(45) Date of Patent: Dec. 30, 2025

(54) FUEL CELL SYSTEM

(71) Applicant: Mitsubishi Electric Corporation, Tokyo (JP)

(72) Inventor: Toshio Shinoki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 240 days.

(21) Appl. No.: 18/288,823

(22) PCT Filed: May 11, 2021

(86) PCT No.: PCT/JP2021/017872
§ 371 (c)(1),
(2) Date: Oct. 30, 2023

(87) PCT Pub. No.: WO2022/239108
PCT Pub. Date: Nov. 17, 2022

(65) Prior Publication Data
US 2024/0204225 A1    Jun. 20, 2024

(51) Int. Cl.
*H01M 8/04858* (2016.01)
*H01M 8/04007* (2016.01)
(Continued)

(52) U.S. Cl.
CPC ...  *H01M 8/04925* (2013.01); *H01M 8/04022* (2013.01); *H01M 8/04037* (2013.01);
(Continued)

(58) Field of Classification Search
CPC ......... H01M 8/04925; H01M 8/04225; H01M 8/04228; H01M 8/04022; H01M 8/04037;
(Continued)

(56) References Cited

U.S. PATENT DOCUMENTS 6,007,931 A * 12/1999 Fuller ................. H01M 8/0612
429/425
2003/0207163 A1* 11/2003 Chen ................. H01M 8/04014
429/423
(Continued)

FOREIGN PATENT DOCUMENTS

JP    S62-070202 A    3/1987
JP    H07-230816 A    8/1995
(Continued)

OTHER PUBLICATIONS

International Search Report and Written Opinion mailed on Aug. 3, 2021, received for PCT Application PCT/JP2021/017872, filed on May 11, 2021, 10 pages including English Translation.

*Primary Examiner* — Matthew J Merkling
(74) *Attorney, Agent, or Firm* — XSENSUS LLP

(57) ABSTRACT

A fuel cell system includes: a steam generator configured to heat water to generate steam; a reformer configured to cause a reaction between the steam and hydrocarbon to generate a reformed gas; a fuel cell stack, which has an anode and a cathode, and is configured to generate electric energy through an electrochemical reaction caused between the reformed gas and an oxidant; and an ejector configured to supply at least one of a raw material containing the hydrocarbon or an anode circulating gas. The steam generator includes: an evaporation flow passage through which the water flows; an anode exhaust gas flow passage that is thermally connected to the evaporation flow passage and through which the anode exhaust gas flows; and an auxiliary heating device configured to heat the water. The anode exhaust gas flow passage and the auxiliary heating device are opposed to each other across the evaporation flow passage.

17 Claims, 9 Drawing Sheets

(51) Int. Cl.
*H01M 8/04014* (2016.01)
*H01M 8/04089* (2016.01)
*H01M 8/04119* (2016.01)
*H01M 8/04223* (2016.01)
*H01M 8/04225* (2016.01)
*H01M 8/04228* (2016.01)
*H01M 8/0432* (2016.01)
*H01M 8/04701* (2016.01)
*H01M 8/04746* (2016.01)
*H01M 8/0612* (2016.01)

(52) U.S. Cl.
CPC ... *H01M 8/04097* (2013.01); *H01M 8/04156* (2013.01); *H01M 8/04225* (2016.02); *H01M 8/04228* (2016.02); *H01M 8/04268* (2013.01); *H01M 8/04343* (2013.01); *H01M 8/04365* (2013.01); *H01M 8/04373* (2013.01); *H01M 8/04738* (2013.01); *H01M 8/04761* (2013.01); *H01M 8/0618* (2013.01)

(58) Field of Classification Search
CPC ......... H01M 8/04156; H01M 8/04268; H01M 8/04343; H01M 8/04365; H01M 8/04373; H01M 8/04738; H01M 8/04761; F28D 7/02–028
See application file for complete search history.

(56) References Cited

U.S. PATENT DOCUMENTS

| | | | |
|---|---|---|---|
| 2005/0181247 A1* | 8/2005 | Foger | H01M 8/04014 429/495 |
| 2007/0039725 A1* | 2/2007 | Valensa | F22B 13/005 422/198 |
| 2008/0107932 A1* | 5/2008 | Pham | C01B 3/382 429/495 |
| 2008/0141951 A1* | 6/2008 | Liu | C01B 3/382 122/18.2 |
| 2010/0136443 A1* | 6/2010 | Vincitore | H01M 8/04007 429/423 |
| 2010/0304244 A1 | 12/2010 | Tsuchiya et al. | |
| 2023/0041819 A1 | 2/2023 | Shinoki et al. | |

FOREIGN PATENT DOCUMENTS

| | | |
|---|---|---|
| JP | 2004-014141 A | 1/2004 |
| JP | 2006-076850 A | 3/2006 |
| JP | 2011-009195 A | 1/2011 |
| JP | 2011-204390 A | 10/2011 |
| JP | 2018-198116 A | 12/2018 |
| JP | 6824485 B1 | 2/2021 |

* cited by examiner

FUEL CELL SYSTEM

CROSS-REFERENCE TO RELATED APPLICATION

This application is based on PCT filing PCT/JP2021/017872, filed May 11, 2021, the entire contents of which are incorporated herein by reference.

TECHNICAL FIELD

This disclosure relates to a fuel cell system including a steam generator.

BACKGROUND ART

In Patent Literature 1, there is described an evaporator for a reformer, which is provided in a stage that precedes a reformer in a fuel cell system. This evaporator for a reformer includes a burner as a heat generating part. A steam generating tube is wound helically around an outer periphery of the heat generating part. Thermal energy generated by combustion caused by the burner is transferred to the steam generating tube. As a result, water in the steam generating tube is vaporized.

CITATION LIST

Patent Literature

[PTL 1] JP 2004-14141 A

SUMMARY OF INVENTION

Technical Problem

However, in order to continue applying vaporization heat to water in the evaporator for a reformer, which is described in Patent Literature 1, a combustion gas is required to be continuously supplied to the burner. Thus, the fuel cell system using the evaporator for a reformer, which is described in Patent Literature 1, has a problem in that its energy efficiency is low.

This disclosure has been made to solve the problem described above, and has an object to provide a fuel cell system capable of achieving higher energy efficiency.

Solution to Problem

The fuel cell system according to this disclosure includes: a steam generator configured to heat water to generate steam; a reforming part configured to cause a reaction between the steam and hydrocarbon to generate a reformed gas containing hydrogen; a fuel cell stack, which has an anode and a cathode, and is configured to generate electric energy through an electrochemical reaction caused d between the reformed gas supplied to the anode and an oxidant supplied to the cathode; and an ejector configured to supply at least one of a raw material containing the hydrocarbon or an anode circulating gas obtained by recovering a part of an anode exhaust gas discharged from the anode to the reforming part by using the steam as a driving fluid. The steam generator includes: an evaporation flow passage through which the water flows; an anode exhaust gas flow passage that is thermally connected to the evaporation flow passage and through which the anode exhaust gas flows; and an auxiliary heating device configured to heat the water. The anode exhaust gas flow passage and the auxiliary heating device are opposed to each other across the evaporation flow passage.

Advantageous Effects of Invention

According to this disclosure, in the fuel cell system, it is possible to achieve higher energy efficiency.

DESCRIPTION OF EMBODIMENTS

First Embodiment

Figure 1:
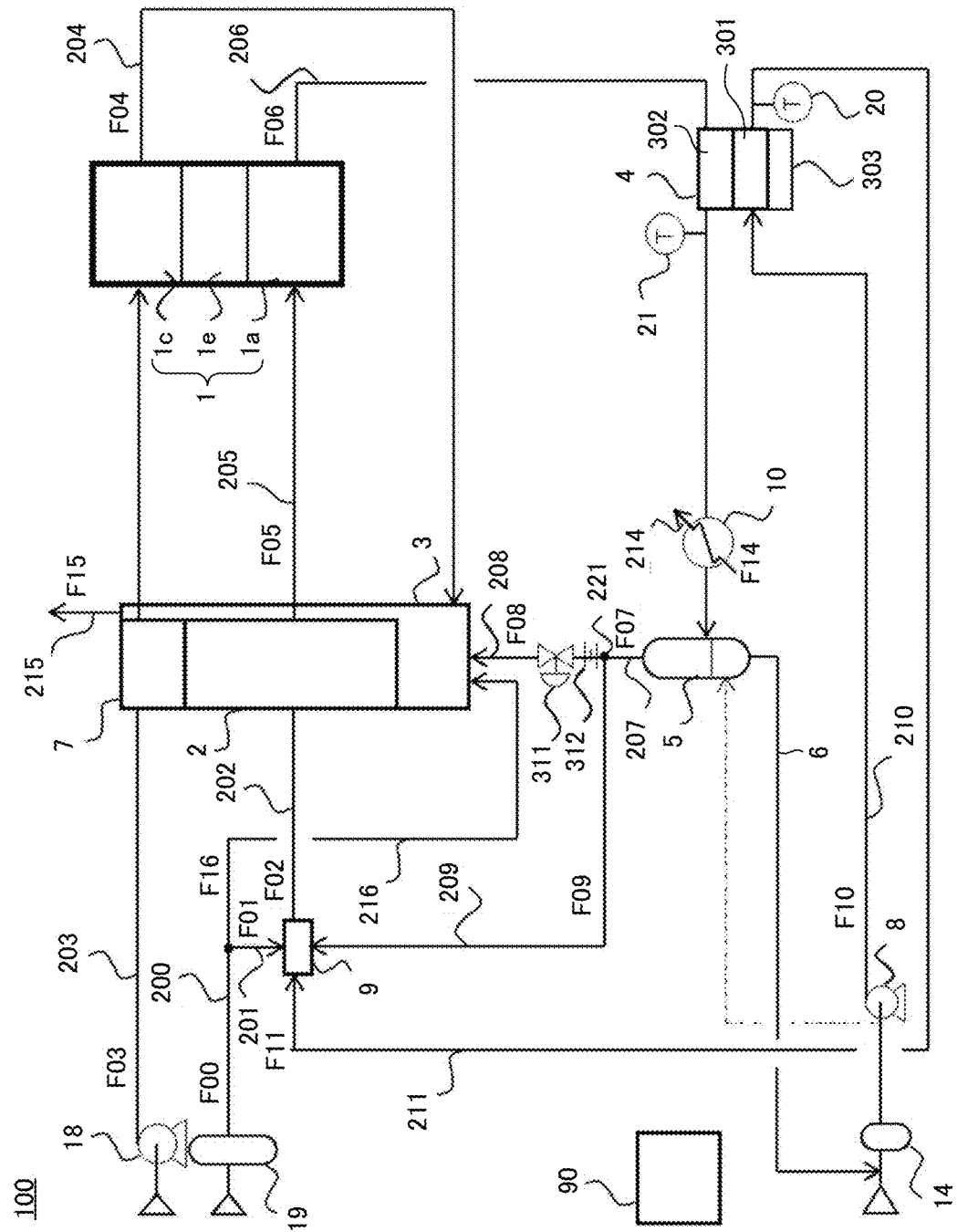
FIG. 1 is a system diagram for illustrating a configuration of a fuel cell system according to a first embodiment.

A fuel cell system according to a first embodiment is described. FIG. 1 is a system diagram for illustrating a configuration of the fuel cell system according to this embodiment. First, a basic configuration of a fuel cell system 100 according to this embodiment is described.

As illustrated in FIG. 1, the fuel cell system 100 includes devices such as a fuel cell stack 1, a reformer 2, a combustor 3, a steam generator 4, a water separator 5, a recovery branch portion 221, an oxidant heat exchanger 7, a water pump 8, an ejector 9, a heat recovery cooler 10, an air blower 18, a raw-material pretreatment device 19, and a water treatment device 14. In the devices, a raw material, an oxidant, water, or a fluid derived therefrom is treated. In this embodiment, air is used as an oxidant.

The fuel cell system 100 includes a control unit 90. The control unit 90 controls the entirety of the fuel cell system 100 including the above-mentioned devices. The control unit 90 includes a microcomputer including, for example, a central processing unit (CPU), a read only memory (ROM), and a random access memory (RAM).

The fuel cell system 100 includes a plurality of lines 200 to 211 and 214 to 216, each serving as a flow channel for a fluid. Each of the lines 200 to 211 and 214 to 216 is formed with use of a pipe.

A raw material line 200 is a line serving as a flow channel for a raw material FOO. A reforming raw material line 201 is a line serving as a flow channel for a raw material F01 for reforming. A fuel gas line 202 is a line serving as a flow channel for a fuel gas F02. An oxidant line 203 is a line serving as a flow channel for an oxidant F03. A cathode exhaust gas line 204 is a line serving as a flow channel for a cathode exhaust gas F04. A reformed gas line 205 is a line serving as a flow channel for a reformed gas F05. An anode exhaust gas line 206 is a line serving as a flow channel for an anode exhaust gas F06. An anode recovered gas line 207 is a line serving as a flow channel for an anode recovered gas F07. A recycled combustion gas line 208 is a line serving as a flow channel for a recycled combustion gas F08. An anode circulating gas line 209 is a line serving as a flow channel for an anode circulating gas F09. A circulating water line 210 is a line serving as a flow channel for a circulating water F10. A steam line 211 is a line serving as a flow channel for a steam F11. A heat recovery line 214 is a line serving as a flow channel for a cooling medium F14. A combustion exhaust gas line 215 is a line serving as a flow channel for a combustion exhaust gas F15. An auxiliary combustion fuel line 216 is a line serving as a flow channel for an auxiliary combustion fuel F16.

The raw material F00 such as city gas is supplied to the raw material line 200 from an outside. The raw-material pretreatment device 19 is provided in the raw material line 200. The raw-material pretreatment device 19 is configured to remove an unnecessary component, for example, a sulfur component from the raw material FOO. The raw material line 200 is connected to a suction port of the ejector 9 through intermediation of the reforming raw material line 201.

In this embodiment, the raw material line 200 branches at its downstream end into the reforming raw material line 201 and the auxiliary combustion fuel line 216. A downstream end of the auxiliary combustion fuel line 216 is connected to the combustor 3. Thus, a part of the raw material F00 passes through the auxiliary combustion fuel line 216 and is supplied as the auxiliary combustion fuel F16 to the combustor 3.

The ejector 9 is a circulator that circulates a fluid. The ejector 9 has an inflow port, the suction port, and an outflow port. A driving fluid flows into the inflow port. A sucked fluid flows into the suction port. A fluid mixture being a mixture of the driving fluid and the sucked fluid flows out from the outflow port. A nozzle that jets the driving fluid is provided inside the ejector 9. The inflow port of the ejector 9 is connected to the steam line 211. The suction port of the ejector 9 is connected to the reforming raw material line 201 and the anode circulating gas line 209. The outflow port of the ejector 9 is connected to the fuel gas line 202.

The ejector 9 sucks at least one of the raw material F01 or the anode circulating gas F09 as the sucked fluid by using the steam F11 as the driving fluid. The sucked fluid sucked into the ejector 9 flows out from the ejector 9 together with the steam F11 serving as the driving fluid, passes through the fuel gas line 202, and is supplied to the reformer 2.

The reformer 2 is configured to cause a reaction between the steam F11 and hydrocarbon contained in the raw material F01 to generate the reformed gas F05 containing hydrogen. The reformer 2 serves as a reforming part in the fuel cell system 100. The reformer 2 is thermally connected to the combustor 3 or is integrated with the combustor 3. Thus, heat that is required for a reforming reaction is supplied from the combustor 3 to the reformer 2. The reformer 2 is connected to an anode 1a of the fuel cell stack 1 through intermediation of the reformed gas line 205.

The combustor 3 is configured to combust the cathode exhaust gas F04, the recycled combustion gas F08, or the auxiliary combustion fuel F16 to generate heat. The combustor 3 is connected to the combustion exhaust gas line 215. Gas that has been combusted in the combustor 3 is discharged as the combustion exhaust gas F15 to the outside via the combustion exhaust gas line 215.

Air to be used as the oxidant F03 is supplied from the outside to the oxidant line 203. The air blower 18 is provided in the oxidant line 203. The air blower 18 is a fluid machine that pumps the oxidant F03. The oxidant heat exchanger 7 is provided in the oxidant line 203. A downstream end of the oxidant line 203 is connected to a cathode 1c of the fuel cell stack 1.

The oxidant heat exchanger 7 is thermally connected to the combustor 3 or the reformer 2. The oxidant F03 that has passed through the oxidant heat exchanger 7 is heated with heat supplied from the combustor 3 or the reformer 2. Thus, a temperature of the oxidant F03 supplied to the fuel cell stack 1 is raised.

The fuel cell stack 1 is a heat generating device including a stack of a plurality of cells of a fuel cell. The fuel cell stack 1 has the anode 1a serving as a negative electrode, the cathode 1c serving as a positive electrode, and an electrolyte 1e. The anode 1a and the cathode 1c are separated from each other by the electrolyte 1e. An electrochemical device including the anode 1a, the cathode 1c, and the electrolyte 1e is built in the fuel cell stack 1 by using cell members such as a flow passage, and a separator. The fuel cell stack 1 is configured to electric generate energy through an electrochemical reaction caused between the reformed gas F05 supplied to the anode 1a and the oxidant F03 supplied to the cathode 1c.

An upstream end of the anode exhaust gas line 206 is connected to an outlet of the anode 1a. The anode exhaust gas line 206 passes through an anode exhaust gas flow passage 302 of the steam generator 4. The heat recovery cooler 10 is provided on a downstream side of the anode exhaust gas flow passage 302 in the anode exhaust gas line 206. A downstream end of the anode exhaust gas line 206 is connected to an inflow port of the water separator 5.

An upstream end of the cathode exhaust gas line 204 is connected to an outlet of the cathode 1c. A downstream end of the cathode exhaust gas line 204 is connected to the combustor 3.

The circulating water F10 flows through the circulating water line 210. The circulating water F10 has been recovered by the water pump 8 from the water separator 5. The water treatment device 14 is provided in the circulating water line 210. The water treatment device 14 is configured to remove an unnecessary component such as an ion component from the circulating water F10. In the fuel cell system 100, water is basically self-sustaining. However, raw-material water may be added from the outside as needed.

In the circulating water line 210, the water pump 8 is provided on a downstream side of the water treatment device 14. The water pump 8 is a fluid machine that pumps the circulating water F10. A downstream end of the circulating water line 210 is connected to one end of an evaporation flow passage 301 of the steam generator 4. An upstream end of the steam line 211 is connected to the other end of the evaporation flow passage 301. A downstream end of the steam line 211 is connected to the inflow port of the ejector 9.

The steam generator 4 is configured to heat water to vaporize to thereby generate steam. The steam generator 4 includes the evaporation flow passage 301, the anode exhaust gas flow passage 302, and an auxiliary heating device 303. The circulating water F10 and the steam F11 generated as a result of vaporization of the circulating water F10 flow through the evaporation flow passage 301. The anode exhaust gas F06 flows through the anode exhaust gas flow passage 302. The anode exhaust gas flow passage 302 is thermally connected to the evaporation flow passage 301. The auxiliary heating device 303 is configured to heat the circulating water F10 flowing through the evaporation flow passage 301.

The circulating water F10 flowing into the evaporation flow passage 301 is heated through heat exchange with the anode exhaust gas F06 flowing through the anode exhaust gas flow passage 302. Further, the circulating water F10 is also heated by the auxiliary heating device 303, which is provided separately from the anode exhaust gas flow passage 302. The thus heated circulating water F10 is evaporated into the steam F11, and the steam F11 flows out from the evaporation flow passage 301 into the steam line 211. A specific configuration of the steam generator 4 is described later with reference to FIG. 2.

The heat recovery cooler 10 is a heat exchanger that performs heat exchange between the anode exhaust gas F06 flowing out from the anode exhaust gas flow passage 302 of the steam generator 4 and the cooling medium F14 flowing through the heat recovery line 214.

The water separator 5 is a gas-liquid separator that separates the anode exhaust gas F06 into a gas component and a liquid component. A liquid outflow port of the water separator 5 is connected to the circulating water line 210 on an upstream side of the water treatment device 14 through intermediation of a water pipe 6. A gas outflow port of the water separator 5 is connected to an upstream end of the anode recovered gas line 207.

The anode recovered gas line 207 branches at the recovery branch portion 221 into the recycled combustion gas line 208 and the anode circulating gas line 209. A downstream end of the anode circulating gas line 209 is connected to the suction port of the ejector 9.

A recycled combustion gas flow meter 312 and a recycled combustion gas flow rate control valve 311 are provided in the recycled combustion gas line 208. The recycled combustion gas flow meter 312 is configured to detect a flow rate of the recycled combustion gas F08 flowing g through the recycled combustion gas line 208. The recycled combustion gas flow rate control valve 311 is configured to control a flow rate of the recycled combustion gas F08. The recycled combustion gas flow rate control valve 311 also functions as an interrupting portion that blocks the recycled combustion gas F08. A downstream end of the recycled combustion gas line 208 is connected to the combustor 3.

Next, an operation of the fuel cell system 100 according to this embodiment, which has the above-mentioned basic configuration, is described. In principle, the operation described below is performed when the fuel cell system 100 is in a rated operation state.

The oxidant F03 is caused to flow through the oxidant line 203 by the air blower 18. After a temperature of the oxidant F03 is raised to a temperature suitable for an operation of the fuel cell stack 1 in the oxidant heat exchanger 7, the oxidant F03 is supplied to the cathode 1*c* of the fuel cell stack 1.

The oxidant F03 supplied to the cathode 1*c* consumes a part of oxygen in the electrochemical reaction while being separated from the reformed gas F05 by the electrolyte 1*e*. After consuming a part of oxygen, the oxidant F03 flows out from the cathode 1*c* as the cathode exhaust gas F04. The cathode exhaust gas F04 passes through the cathode exhaust gas line 204 and is supplied to the combustor 3.

The raw material F00 such as city gas flows through the raw material line 200. An unnecessary component contained in the raw material is removed by the raw-material pretreatment device 19. The raw material F00 that has passed through the raw-material pretreatment device 19 is sucked as the raw material F01 for reforming into the ejector 9. The raw material F01 sucked into the ejector 9 is mixed with the anode circulating gas F09 and the steam F11 and flows out as the fuel gas F02 from the ejector 9. The fuel gas F02 passes through the fuel gas line 202 and is supplied to the reformer 2. A part of the raw material F00 that has passed through the raw-material pretreatment device 19 passes through the auxiliary combustion fuel line 216 and is supplied as the auxiliary combustion fuel F16 to the combustor 3.

The fuel gas F02 supplied to the reformer 2 is reformed in the reformer 2 to turn into the reformed gas F05 containing hydrogen as a main component. The reformed gas F05 flowing out from the reformer 2 passes through the reformed gas line 205 and is supplied to the anode 1*a* of the fuel cell stack 1.

The reformed gas F05 supplied to the anode 1*a* consumes a part of fuel in the electrochemical reaction while being separated from the oxidant F03 by the electrolyte 1*e*. After consuming a part of fuel, the reformed gas F05 is discharged from the anode 1*a* as the anode exhaust gas F06. The anode exhaust gas F06 passes through the anode exhaust gas line 206 and flows into the anode exhaust gas flow passage 302 of the steam generator 4.

In the steam generator 4, heat is exchanged between the anode exhaust gas F06 and the circulating water F10. Thus, the anode exhaust gas F06 is cooled, and the circulating water F10 is heated to be vaporized to thereby generate the steam F11. The anode exhaust gas F06 flowing out from the steam generator 4 flows into the heat recovery cooler 10. In the heat recovery cooler 10, heat is exchanged between the anode exhaust gas F06 and the cooling medium F14 flowing through the heat recovery line 214. Thus, the anode exhaust gas F06 is further cooled. The anode exhaust gas F06 that has been cooled flows into the water separator 5.

In the water separator 5, the anode exhaust gas F06 is separated into the gas component and the liquid component. The gas component flows out as the anode recovered gas F07 from the water separator 5 into the anode recovered gas line 207. A part of the anode recovered gas F07 passes through the recycled combustion gas line 208 and is supplied as the recycled combustion gas F08 to the combustor 3. The other part of the anode recovered gas F07 passes through the anode circulating gas line 209 and is sucked as the anode circulating gas F09 into the ejector 9. The anode circulating gas F09 sucked into the ejector 9 is mixed with the raw material F01 and the steam F11 and is supplied as the fuel gas F02 to the reformer 2. Meanwhile, condensate water, which is the liquid component, flows out from the water separator 5, passes through the water pipe 6, and is supplied to the circulating water line 210.

The circulating water F10 that has been recovered from the water separator 5 by the water pump 8 flows through the circulating water line 210. An unnecessary component contained in the circulating water F10 is removed by the water treatment device 14. The circulating water F10 that has passed through the water treatment device 14 in the circulating water line 210 is supplied to the evaporation flow passage 301 of the steam generator 4. In the fuel cell system 100, water is basically self-sustaining. However, raw-material water may be added from the outside as needed.

In the steam generator 4, the circulating water F10 is heated through the heat exchange with the anode exhaust gas F06 or by the auxiliary heating device 303. The thus heated circulating water F10 is evaporated into the steam F11, and the steam F11 flows out from the steam generator 4.

The steam F11 flowing out from the steam generator 4 passes through the water steam line 211 and flows into the ejector 9. The steam F11 flowing into the ejector 9 is jetted out as a driving fluid from the nozzle provided inside the ejector 9. Momentum of the thus jetted steam F11 is applied to the raw material F01 and the anode circulating gas F09. Thus, the raw material F01 and the anode circulating gas F09 are mixed together with the steam F11 into the fuel gas F02, and the fuel gas F02 flows out from the ejector 9. The fuel gas F02 flowing out from the ejector 9 is supplied to the reformer 2.

For example, a filter or a desulfurizer is used as the raw-material pretreatment device 19. Gas containing hydrocarbon is used as the raw material F00. The gas containing hydrocarbon includes a methane gas, a propane gas, a butane gas, a natural gas, city gas, and a digestive gas containing a methane gas as a main component. Further, for example, various kinds of alcohols or a petroleum-based raw material can also be used as the raw material F00. When the raw material F00 is a hydrophilic liquid raw material, the raw material F00 may be mixed into the circulating water in advance. Meanwhile, when the raw material F00 is a hydrophobic liquid raw material, the raw material F00 itself may be preheated to be vaporized, or the raw material F00 and the steam F11 may be preheated to be vaporized while being mixed together.

A steam reforming reaction, for example, is caused in the reformer 2. Typical reforming reactions occurring when methane is used as the raw material are expressed by Expression (1) and Expression (2). A reforming catalyst is supplied in the reformer 2. The reforming catalyst causes an endothermic reaction between methane and steam. This reaction generates hydrogen. In general, a flow rate of steam supplied to the reformer 2 is expressed by a value of S/C. The value of S/C is a mole fraction of steam (S) to carbon (C) contained in the fuel gas. Generally, the flow rate of steam supplied to the reformer 2 is set so that S/C has a given value falling within a range of from about 2.5 to about 3.5. The reformed catalyst has, for example, such a structure that a catalyst such as a Ni-based catalyst, a Pt-based catalyst, or a Ru-based catalyst is carried by a carrier such as $Al_2O_3$ or MgO.

$$CH_4 + H_2O \leftrightarrow CO + 3H_2 \quad (1)$$

$$CO + H_2O \leftrightarrow CO_2 + H_2 \quad (2)$$

In this case, the steam reforming reaction is exemplified. However, the reforming reaction is not limited to the steam reforming reaction. An autothermal reforming reaction or a partial oxidation reforming reaction, in which air is additionally introduced into the reformer 2, may be used as the reforming reaction.

The fuel cell stack 1 causes the electrochemical reaction between the reformed gas F05 supplied to the anode 1a and the oxidant F03 supplied to the cathode 1c under a state in which the reformed gas F05 and the oxidant F03 are separated from each other by the electrolyte 1e. Thus, transfer and reception of electrons generate electric energy in the fuel cell stack 1. Specifically, a potential difference is generated in the fuel cell stack 1 to cause transfer and reception of ions via the electrolyte 1e and the transfer and reception of electrons in a circuit via both output terminals of the anode 1a and the cathode 1c at the same time. At this time, a direct current generated through migration of the electrons in the circuit is output as electric power.

An electrode material and an operating temperature of the fuel cell stack 1, for example, differ depending on the kind of the electrolyte 1e. Further, the kind of ions migrating through the electrolyte 1e also differs depending on the kind of the electrolyte 1e. For example, in a case of a solid oxide fuel cell, an electrode reaction at the anode 1a is expressed by Expression (3), and an electrode reaction at the cathode 1c is expressed by Expression (4).

$$H_2 + O^{2-} \rightarrow H_2O + 2e^- \quad (3)$$

$$\tfrac{1}{2}O_2 + 2e^- \rightarrow O^{2-} \quad (4)$$

Hydrogen corresponding to the amount of migration of electrons is consumed in the electrode reaction at the anode 1a. Thus, a partial pressure of hydrogen becomes lower in a direction toward an anode outlet in the anode 1a. The same amount of substance of water as the amount of substance of consumed hydrogen is generated in the anode 1a. Thus, a partial pressure of steam becomes higher in the direction toward the anode outlet in the anode 1a.

Meanwhile, oxygen corresponding to the amount of migration of electrons is consumed in the electrode reaction at the cathode 1c. Thus, a gas flow rate decreases and a partial pressure of oxygen becomes lower in a direction toward a cathode outlet in the cathode 1c. In a case of the solid oxide fuel cell, internal reforming in which the electrode reaction and the reforming reaction are caused to proceed at the same time can be performed in the anode 1a. In this case, the reforming reaction of residual methane, which has not been successfully reformed in the reformer 2, can be caused to proceed in a direction of hydrogen generation in the anode 1a.

The fuel cell stack 1 often operates in such a manner that a ratio of the amount of hydrogen consumed in the electrode reaction at the anode 1a to a flow rate of hydrogen that is supplied from the reformer 2 or is generated through the internal reforming falls within a range of from about 0.60 to about 0.85. Specifically, the anode exhaust gas F06 at the anode outlet contains a residual fuel. For example, a volume mole fraction of hydrogen contained in the anode exhaust gas F06 at the anode outlet is about 12%. Further, for example, a volume mole fraction of steam contained in the anode exhaust gas F06 at the anode outlet is about 60%.

Further, the fuel cell stack 1 often operates in such a manner that a ratio of the amount of oxygen consumed in the electrode reaction at the cathode 1c to a flow rate of oxygen that is supplied via the oxidant line 203 falls within a range of from about 0.15 to about 0.50. Specifically, the cathode exhaust gas F04 at the cathode outlet contains residual oxygen. For example, a volume mole fraction of oxygen contained in the cathode exhaust gas F04 at the cathode outlet is about 16%.

A specific configuration of the fuel cell system 100 according to this embodiment is described based on the basic configuration and the operation of the fuel cell system 100 described above.

A temperature difference and an enthalpy difference between the anode exhaust gas F06 and the circulating water F10, and the auxiliary heating device 303 are used as heat sources for the steam generator 4 in the fuel cell system 100 according to this embodiment. This also applies to fuel cell systems 100 according to second and subsequent embodiments described later.

Figure 2:
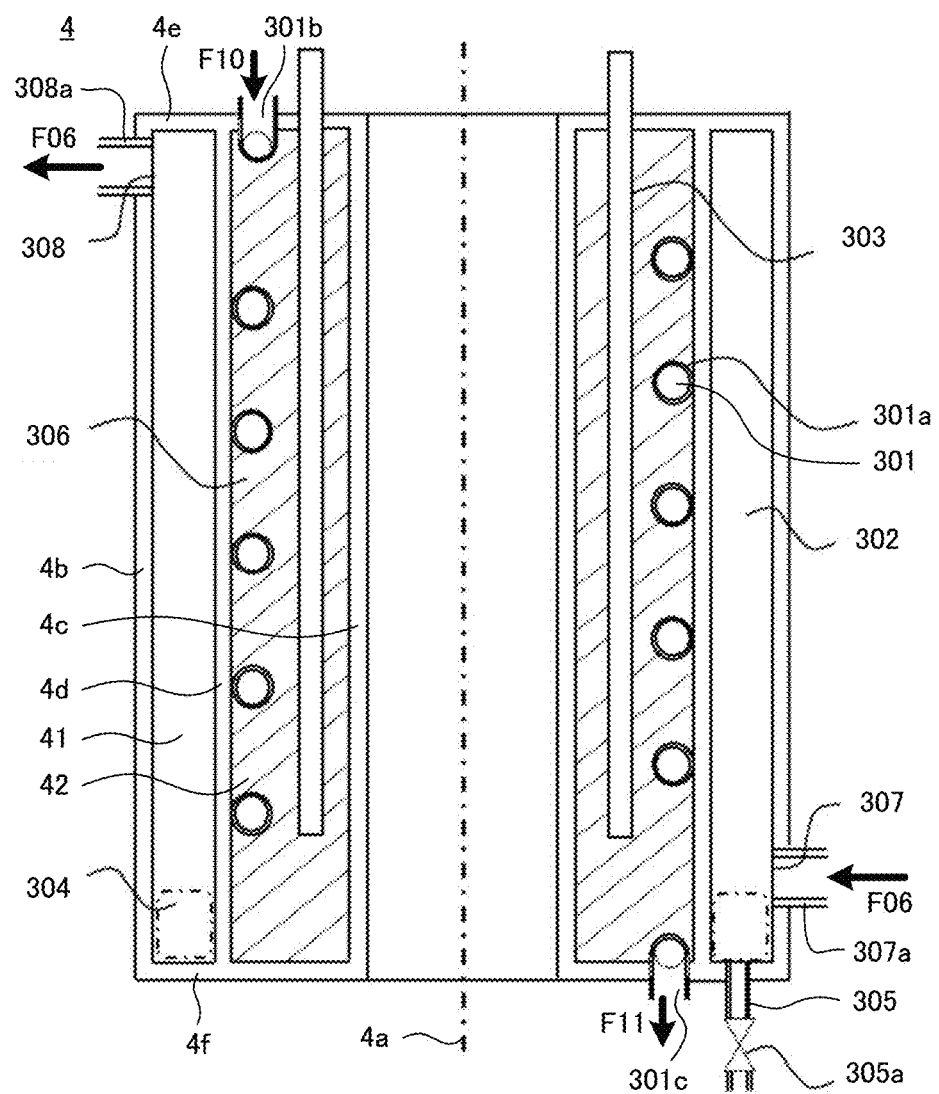
FIG. 2 is a sectional view for illustrating an internal structure of a steam generator in the fuel cell system according to the first embodiment.

FIG. 2 is a sectional view for illustrating an internal structure of the steam generator of the fuel cell system according to this embodiment. An up-and-down direction of FIG. 2 corresponds to a vertical up-and-down direction. Each thick arrow in FIG. 2 indicates a direction of flow of a fluid.

As illustrated in FIG. 2, the steam generator 4 has a cylindrical shape as a whole. A center axis 4a of the steam generator 4 extends in the up-and-down direction. The steam generator 4 has an outer peripheral wall 4b and an inner peripheral wall 4c that is provided on an inner periphery side of the outer peripheral wall 4b. Each of the outer peripheral wall 4b and the inner peripheral wall 4c is formed in a cylindrical shape having the center axis 4a as a center and extends in the up-and-down direction. An annular space is formed between the outer peripheral wall 4b and the inner peripheral wall 4c.

A partition wall 4d is formed between the outer peripheral wall 4b and the inner peripheral wall 4c, that is, on an inner periphery side of the outer peripheral wall 4b and on an outer periphery side of the inner peripheral wall 4c. The partition wall 4d is formed in a cylindrical shape coaxial with the outer peripheral wall 4b and the inner peripheral wall 4c, and extends in the up-and-down direction. The space defined between the outer peripheral wall 4b and the inner peripheral wall 4c is partitioned by the partition wall 4d into an outer peripheral space 41 and an inner peripheral space 42. Each of the outer peripheral space 41 and the inner peripheral space 42 is an annular space. An upper end of the outer peripheral space 41 and an upper end of the inner peripheral space 42 are closed with an upper wall 4e. A lower end of the outer peripheral space 41 and a lower end of the inner peripheral space 42 are closed with a lower wall 4f. Each of the upper wall 4e and the lower wall 4f is formed in an annular shape.

The evaporation flow passage 301 is formed in the inner peripheral space 42. A heat transfer pipe 301a having a helical pipe structure is provided in the inner peripheral space 42. The heat transfer pipe 301a extends helically along the partition wall 4d about the center axis 4a serving as an axis of helix. An evaporation flow passage inlet 301b, which serves as an inlet of the evaporation flow passage 301, is formed at an upper end portion of the heat transfer pipe 301a. An evaporation flow passage outlet 301c, which serves as an outlet of the evaporation flow passage 301, is formed at a lower end portion of the heat transfer pipe 301a. The heat transfer pipe 301a is installed so that its height from the lower wall 4f monotonously decreases from the evaporation flow passage inlet 301b toward the evaporation flow passage outlet 301c. The heat transfer pipe 301a is in close contact with an inner peripheral surface of the partition wall 4d. Thus, thermal energy easily transfers between the heat transfer pipe 301a and the partition wall 4d.

The evaporation flow passage 301 is defined inside the heat transfer pipe 301a. Specifically, the evaporation flow passage 301 is formed helically about the center axis 4a serving as an axis of helix. The evaporation flow passage 301 extends obliquely with respect to the up-and-down direction. The evaporation flow passage 301 has a down gradient from an upstream side toward a downstream side. The circulating water F10 flowing into the evaporation flow passage 301 from the evaporation flow passage inlet 301b gradually evaporates while flowing downward along the evaporation flow passage 301 and flows out as the steam F11 from the evaporation flow passage outlet 301c.

The auxiliary heating device 303 is a heating device that heats the circulating water F10 flowing through the evaporation flow passage 301. The auxiliary heating device 303 is provided in the inner peripheral space 42. The auxiliary heating device 303 is provided on an inner periphery side of the evaporation flow specifically, between the passage 301, evaporation flow passage 301 and the center axis 4a. The auxiliary heating device 303 is controlled by the control unit 90.

An electric heater, for example, is used as the auxiliary heating device 303. The auxiliary heating device 303 includes, for example, a plurality of electric heaters, each being formed in a straight pipe shape. In this case, the plurality of electric heaters are arranged on a circumference having the center axis 4a as a center. Each of the plurality of electric heaters is arranged in parallel to the center axis 4a. The auxiliary heating device 303 may be formed in a cylindrical shape having the center axis 4a as a center.

A heat transfer promoting member 306 is supplied around the evaporation flow passage 301 and the auxiliary heating device 303 in the inner peripheral space 42. Thus, thermal energy easily transfers between the evaporation flow passage 301 and the auxiliary heating device 303. The evaporation flow passage 301 and the auxiliary heating device 303 are thermally connected to each other via the heat transfer promoting member 306. For example, metal particles, a metal mesh, or heat transfer cement are used as the heat transfer promoting member 306.

The anode exhaust gas flow passage 302 is provided in the outer peripheral space 41. In this embodiment, the entire outer peripheral space 41 serves as the anode exhaust gas flow passage 302. The anode exhaust gas flow passage 302 is defined by the outer peripheral wall 4b, the partition wall 4d, the upper wall 4e, and the lower wall 4f. Specifically, the outer peripheral wall 4b, the partition wall 4d, the upper wall 4e, and the lower wall 4f serve as flow passage walls of the anode exhaust gas flow passage 302.

The anode exhaust gas flow passage 302 is thermally connected to the evaporation flow passage 301 via the partition wall 4d and the heat transfer pipe 301a. Heat transfer fins, for example, offset fins, which are thermally connected to the partition wall 4d, are provided in the anode exhaust gas flow passage 302. Thus, heat transfer performance between the anode exhaust gas F06 and the partition wall 4d is improved, and hence the steam generator 4 can be downsized.

The steam generator 4 includes an inflow pipe 307a and an outflow pipe 308a. The inflow pipe 307a defines an anode exhaust gas flow passage inlet 307. The outflow pipe 308a defines an anode exhaust gas flow passage outlet 308. The anode exhaust gas F06 flows into the anode exhaust gas flow passage 302 via the inflow pipe 307a and flows out from the anode exhaust gas flow passage 302 via the outflow pipe 308a.

The inflow pipe 307a is connected to a lower part of the anode exhaust gas flow passage 302. The inflow pipe 307a penetrates the outer peripheral wall 4b and extends in a radial direction of the steam generator 4. In this case, the radial direction of the steam generator 4 is a direction extending along a radius of the steam generator 4 having the center axis 4a as a center.

The outflow pipe 308a is connected to an upper end portion of the anode exhaust gas flow passage 302. The outflow pipe 308a penetrates the outer peripheral wall 4b and extends in the radial direction of the steam generator 4. When viewed along the center axis 4a, the outflow pipe 308a is arranged at a position symmetric with the inflow pipe 307a with respect to the center axis 4a as a center.

The anode exhaust gas F06 flows through the anode exhaust gas flow passage 302 from the anode exhaust gas flow passage inlet 307 toward the anode exhaust gas flow passage outlet 308. The circulating water F10 and the steam F11 flow downward from an upper part, while the anode exhaust gas F06 flows upward from a lower part. Specifically, flow of the anode exhaust gas F06 is counter flow with respect to flow of the circulating water F10 and the steam F11.

Heat exchange between the anode exhaust gas F06 and the circulating water F10 is performed between the anode exhaust gas flow passage 302 and the evaporation flow passage 301. Thus, the circulating water F10 is heated to be vaporized to thereby generate the steam F11.

The anode exhaust gas flow passage 302 and the auxiliary heating device 303 are opposed to each other across the evaporation flow passage 301. Specifically, the evaporation flow passage 301 is interposed between the anode exhaust gas flow passage 302 and the auxiliary heating device 303. Thus, the circulating water F10 flowing through the evaporation flow passage 301 is heated from both sides by the anode exhaust gas F06 and the auxiliary heating device 303.

A dew condensation water storage space 304 that stores dew condensation water is defined below both of the inflow pipe 307a and the outflow pipe 308a in the anode exhaust gas flow passage 302. Specifically, the dew condensation water storage space 304 is provided below both of the anode exhaust gas flow passage inlet 307 and the anode exhaust gas flow passage outlet 308. A dew condensation water discharge pipe 305 is connected to a bottom portion of the dew condensation water storage space 304. The dew condensation water discharge pipe 305 penetrates the lower wall 4f and extends downward. A dew condensation water discharge valve 305a is provided in the dew condensation water discharge pipe 305.

A steam temperature sensor 20 is provided in the steam line 211 that is located on a downstream side of the evaporation flow passage 301. The steam temperature sensor 20 is configured to detect a temperature of the steam F11 flowing out from the evaporation flow passage 301 and output a detection signal to the control unit 90.

An anode gas temperature sensor 21 is provided on a downstream side of the anode exhaust gas flow passage 302 in the anode exhaust gas line 206. The anode exhaust gas temperature sensor 21 is configured to detect a temperature of the anode exhaust gas F06 flowing out from the anode exhaust gas flow passage 302 and output a detection signal to the control unit 90.

Next, an operation of the fuel cell system 100 is described based mainly on the above-mentioned specific configuration. The circulating water F10 is supplied to the evaporation flow passage 301 of the steam generator 4 by the water pump 8. The circulating water F10 flows through the evaporation flow passage 301 from the evaporation flow passage inlet 301b toward the evaporation flow passage outlet 301c by a discharge pressure of the water pump 8 and gravity.

The anode exhaust gas F06 discharged from the anode 1a is supplied to the anode exhaust gas flow passage 302 of the steam generator 4. Thermal energy is transferred from the anode exhaust gas F06 flowing through the anode exhaust gas flow passage 302 to the circulating water F10 flowing through the evaporation flow passage 301 via the partition wall 4d and the heat transfer pipe 301a. Thus, the circulating water F10 is vaporized into the steam F11. The anode exhaust gas F06 flowing out from the anode exhaust gas flow passage 302 passes through the anode exhaust gas line 206 and flows into the heat recovery cooler 10.

The control unit 90 acquires information of the temperature of the anode exhaust gas F06 flowing out from the anode exhaust gas flow passage 302 based on the detection signal from the anode exhaust gas temperature sensor 21. The control unit 90 controls the auxiliary heating device 303 based on the temperature of the anode exhaust gas F06 flowing out from the anode exhaust gas flow passage 302. Specifically, the control unit 90 operates the auxiliary heating device 303 when the temperature of the anode exhaust gas F06, which is detected by the anode exhaust gas temperature sensor 21, becomes lower than a lower limit threshold value. The control unit 90 stops the auxiliary heating device 303 when the temperature of the anode exhaust gas F06, which is detected by the anode exhaust gas temperature sensor 21, becomes higher than an upper limit threshold value.

The auxiliary heating device 303 may be controlled by ON/OFF control or stepwise or continuous phase control. For example, when the temperature of the anode exhaust gas F06, which is detected by the anode exhaust gas temperature sensor 21, is between the lower limit threshold value and the upper limit threshold value, the control unit 90 may stepwisely or continuously control the output of the auxiliary heating device 303 depending on the temperature.

When the auxiliary heating device 303 is operated, the circulating water F10 flowing through the evaporation flow passage 301 is heated by the anode exhaust gas F06 and also by the auxiliary heating device 303. Specifically, the circulating water F10 flowing through the evaporation flow passage 301 is heated from both sides by the anode exhaust gas F06 flowing through the anode exhaust gas flow passage 302 and the auxiliary heating device 303. Thus, sufficient vaporization heat is applied to the circulating water F10.

The anode exhaust gas temperature sensor 21 may be provided at the anode exhaust gas flow passage outlet 308 or in the vicinity thereof. Even in this case, the control unit 90 controls the auxiliary heating device 303 in the same manner as that described above based on the temperature of the anode exhaust gas F06, which is detected by the anode exhaust gas temperature sensor 21.

In this embodiment, the auxiliary heating device 303 is controlled based on the temperature of the anode exhaust gas F06 flowing out from the anode exhaust gas flow passage 302. However, the control of the auxiliary heating device 303 is not limited to the above-mentioned control. The control unit 90 may control the auxiliary heating device 303 based on the temperature detected by the steam temperature sensor 20, that is, the temperature of the steam F11 flowing out from the evaporation flow passage 301. Further, the control unit 90 may control the auxiliary heating device 303 based on both of the temperature of the anode exhaust gas F06 flowing out from the anode exhaust gas flow passage 302 and the temperature of the steam F11 flowing out from the evaporation flow passage 301.

Further, the anode exhaust gas temperature sensor 21 may be provided on an upstream side of the anode exhaust gas flow passage 302 in the anode exhaust gas line 206. In this case, the control unit 90 calculates thermal energy of the anode exhaust gas F06 based on the detection signal from the anode exhaust gas temperature sensor 21 and an operating-condition signal for the fuel cell system 100, which is input to the control unit 90. The control unit 90 compares the thermal energy of the anode exhaust gas F06 and thermal energy that is required for vaporization of the circulating water F10. When the thermal energy that is required for the vaporization of the circulating water F10 is insufficient, the output of the auxiliary heating device 303 is controlled based on a difference therebetween.

In the fuel cell system 100, when the thermal energy that is required for the vaporization of the circulating water F10 is obtained from the anode exhaust gas F06, the control unit 90 is not required to operate the auxiliary heating device 303. Meanwhile, when the thermal energy that is required for the vaporization of the circulating water F10 is not obtained from the anode exhaust gas F06 due to, for example, a fluctuation in output of the fuel cell system 100, the control unit 90 operates the auxiliary heating device 303.

In the anode exhaust gas flow passage 302, when the temperature of the anode exhaust gas F06 is decreased to a dew point or lower as a result of the transfer of the thermal energy from the anode exhaust gas F06 to the circulating water F10, dew condensation occurs in the anode exhaust gas F06. In this embodiment, dew condensation water resulting from the dew condensation of the anode exhaust gas F06 is stored in the dew condensation water storage space 304 that is defined below the anode exhaust gas flow passage inlet 307. The dew condensation water stored in the dew condensation water storage space 304 is suitably discharged via the dew condensation water discharge valve 305a. Thus, blockage of the anode exhaust gas flow passage 302 with the dew condensation water can be suppressed, and hence occurrence of pulsation in the anode exhaust gas F06 can be prevented.

It is desired that the dew condensation water be automatically discharged based on the amount of dew condensation water in the dew condensation water storage space 304. For example, the dew condensation water discharge valve 305a may be configured to be opened by weight of the dew condensation water in the dew condensation water storage space 304. Alternatively, a U-shaped pipe may be provided to the dew condensation water discharge pipe 305 so that the dew condensation water is discharged based on a water head difference of the dew condensation water. It is apparent that the dew condensation water discharge valve 305a may be opened and closed based on a timer so that the dew condensation water is regularly discharged.

The anode exhaust gas F06 flowing out from the anode exhaust gas flow passage 302 further provides thermal energy to the cooling medium F14 in the heat recovery cooler 10 and flows into the water separator 5. The temperature of the anode exhaust gas F06 flowing into the water separator 5 becomes equal to a predetermined temperature that is a dew point or lower. In order to make the temperature of the anode exhaust gas F06 in the water separator 5 closer to a target temperature, the control unit 90 controls a flow rate of the cooling medium F14 based on the temperature of the anode exhaust gas F06 that has passed through the heat recovery cooler 10 or the temperature of the anode exhaust gas F06 in the water separator 5. The temperature of the anode exhaust gas F06 that has passed through the heat recovery cooler 10 or the temperature of the anode exhaust gas F06 in the water separator 5 is detected by a temperature sensor (not shown).

Moisture contained in the anode exhaust gas F06 is liquefied in the water separator 5 based on a saturated steam pressure at the temperature of the anode exhaust gas F06. The liquefied moisture turns into water droplets, and the water droplets are separated from the anode exhaust gas F06 and are stored as condensate water in a lower part of the water separator 5. The condensate water stored in the water separator 5 passes through the water pipe 6 and is supplied as the circulating water F10 to the circulating water line 210. The circulating water F10 is supplied to the steam generator 4 by the water pump 8 based on a flow rate of the steam F11, which is required for the fuel gas F02.

Meanwhile, the anode exhaust gas F06 from which the moisture has been removed in the water separator 5 flows out as the anode recovered gas F07 from the water separator 5 and passes through the anode recovered gas line 207 to reach the recovery branch portion 221. The anode recovered gas F07 is separated at the recovery branch portion 221 into the recycled combustion gas F08 that flows through the recycled combustion gas line 208 and the anode circulating gas F09 that flows through the anode circulating gas line 209. The recycled combustion gas F08 passes through the recycled combustion gas flow meter 312 and the recycled combustion gas flow rate control valve 311 and is supplied to the combustor 3.

An opening degree of the recycled combustion gas flow rate control valve 311 is controlled by the control unit 90 based on, for example, a flow rate signal from the recycled combustion gas flow meter 312. Thus, the recycled combustion gas F08 and the anode circulating gas F09 are distributed from the recovery branch portion 221 at a suitable flow rate ratio that is determined based on operating conditions of the fuel cell system 100. Thus, higher efficiency of the fuel cell system 100 is achieved.

The recycled combustion gas F08, the cathode exhaust gas F04 discharged from the cathode 1c, and the auxiliary combustion fuel F16 are supplied to the combustor 3. The above-mentioned gases are combusted in the combustor 3. A part of thermal energy of the combusted gases is supplied as thermal energy that is required for the reforming reaction, to the reformer 2. Thus, a temperature of the reformer 2 is raised to a temperature that is required for the reforming reaction. The temperature that is required for the reforming reaction in the reformer 2 is, for example, 600° C.

Another part of the thermal energy of the combusted gases is supplied to the oxidant F03 in the oxidant heat exchanger 7. Thus, the temperature of the oxidant F03 is raised to a temperature at which the cathode 1c of the fuel cell stack 1 can be operated. For example, the temperature of the oxidant F03 is raised from 25° C., which is a temperature of outside air, to 600° C.

After providing the thermal energy to the reformer 2 and the oxidant heat exchanger 7, the gases that have been combusted in the combustor 3 are discharged as the combustion exhaust gas F15 to the outside via the combustion exhaust gas line 215.

The anode circulating gas F09 passes through the anode circulating gas line 209 and is sucked into the ejector 9. The anode circulating gas F09 sucked into the ejector 9 is mixed with the steam F11 and the raw material F01 and flows out as the fuel gas F02 from the ejector 9. The fuel gas F02 passes through the fuel gas line 202 and is supplied to the reformer 2.

Whether the above-mentioned operation is achievable or not is examined based on enthalpy per output of the fuel cell stack 1. As one example, it is assumed that the fuel cell system 100 includes a solid oxide fuel cell using city gas as a raw material and operates at a fuel utilization rate of 75%, a cell voltage of 0.84 V, and a current of 24 A. Under these conditions, the anode exhaust gas F06 at the anode outlet has enthalpy of $-3,081$ J/s·kW per output of the fuel cell stack 1.

Meanwhile, vaporization heat that is required to turn the circulating water F10 into the steam F11 is estimated to be 247 J/s·kW. Thus, the temperature of the anode exhaust gas F06 after the thermal energy is provided to the circulating water F10 in the steam generator 4 exceeds 150° C. based on a heat balance calculation. Specifically, the thermal energy that is required to turn the circulating water F10 into the steam F11 in the steam generator 4 can be obtained from the heat exchange between the circulating water F10 and the anode exhaust gas F06.

It is assumed that the temperature of the anode exhaust gas F06 in the water separator 5 is, for example, 60° C. A saturated steam pressure at this temperature is about 0.025 MPa. A volume mole fraction of steam contained in the anode exhaust gas F06 at the anode outlet is about 60%. Meanwhile, a volume mole fraction of steam contained in the anode exhaust gas F06 in the water separator 5 is reduced to about 20% along with a decrease in flow rate of the steam to about half due to condensation of the steam. The anode exhaust gas F06 flows out as the anode recovered gas F07 from the water separator 5.

The anode recovered gas F07 flowing out from the water separator 5 is split at the recovery branch portion 221 into the recycled combustion gas F08 and the anode circulating gas F09, each having substantially the same flow rate.

Thus, the flow rate of the anode circulating gas F09 is about one-quarter of the flow rate of the anode exhaust gas F06 at the anode outlet. Further, the flow rate of steam contained in the anode circulating gas F09 is about 8% of the flow rate of the steam contained in the anode exhaust gas F06 at the anode outlet. The flow rate of the steam contained in the anode exhaust gas F06 at the anode outlet is only about 15% of the flow rate of steam that is required for the reformer 2 or the fuel cell stack 1. In order to compensate for a shortage of steam, the steam F11 of about 0.5 MPa is generated in the steam generator 4 by vaporizing the circulating water F10.

Next, an operation of the fuel cell system 100, which is performed when the output of the fuel cell stack 1 is to be increased, is described. When the output of the fuel cell stack 1 is increased, the flow rates of the oxidant F03, the raw material F01, and the steam F11, which are required for a cell reaction, are increased by control of the control unit 90 depending on output load conditions.

In this case, regarding the raw material F01 and the steam F11, when a value of S/C becomes smaller than a given value in a reforming-catalyst supplied part inside the reformer 2, there is a possibility that the reforming reactions expressed by Expression (1) and Expression (2) do not occur and, for example, carbon (C) deposition may occur. As a result, deposited C may cause a problem such as flow passage blockage. In order to prevent this problem, the control unit 90 increases the flow rate of the steam F11 before increasing the flow rate of the raw material F01. Specifically, when the output of the fuel cell stack 1 is to be increased, the flow rate of the steam F11, that is, the flow rate of the circulating water F10 is required to be first increased. The increase in the flow rate of the circulating water F10 requires vaporization heat corresponding to the amount of increase in flow rate of the circulating water F10, in the steam generator 4.

In this embodiment, when the flow rate of the circulating water F10 is increased, the temperature of the anode exhaust gas F06, which is detected by the anode exhaust gas temperature sensor 21, decreases. Thus, the auxiliary heating device 303 is operated. Specifically, thermal energy is supplementarily provided to the circulating water F10 in the evaporation flow passage 301 by the auxiliary heating device 303. Thus, the vaporization heat corresponding to the amount of increase in flow rate of the circulating water F10 is supplementarily supplied by the auxiliary heating device 303.

After the operating state of the fuel cell system 100 has changed based on the increase in output of the fuel cell stack 1, the vaporization heat for the circulating water F10 can be obtained from the thermal energy from the anode exhaust gas F06. In this case, the temperature of the anode exhaust gas F06, which is detected by the anode exhaust gas temperature sensor 21, increases. Thus, the auxiliary heating device 303 is stopped. After the auxiliary heating device 303 is stopped, the circulating water F10 flowing through the evaporation flow passage 301 is heated from one side only with the anode exhaust gas F06 flowing through the anode exhaust gas flow passage 302.

As described above, according to this embodiment, steam can be stably supplied depending on the operating state of the fuel cell system 100.

The operation of the fuel cell system 100, which is performed when the output of the fuel cell stack 1 is to be increased, is not limited to that of the above-mentioned example. When the vaporization heat for the circulating water F10 becomes insufficient depending on the operating conditions of the fuel cell system 100, the auxiliary heating device 303 may be operated continuously or intermittently. Further, when the amount of increase in output of the fuel cell stack 1 is small and thus the amount of increase in vaporization heat for the circulating water F10 can be obtained from the thermal energy from the anode exhaust gas F06, the auxiliary heating device 303 is not required to be operated.

In this embodiment, the circulating water F10 can be turned into the steam F11 by using the thermal energy of the anode exhaust gas F06 flowing through the anode exhaust gas line 206. Thus, the flow rate of the recycled combustion gas F08 supplied to the combustor 3 can be reduced, and the flow rate of the anode circulating gas F09 to be returned to the reformer 2 via the ejector 9 can be increased. Hence, according to this embodiment, the fuel cell system 100 having high energy efficiency can be achieved.

Further, in this embodiment, the anode exhaust gas flow passage 302 and the auxiliary heating device 303 are opposed to each other across the evaporation flow passage 301 in the steam generator 4. With this arrangement, the circulating water F10 flowing through the evaporation flow passage 301 can be heated from both sides. Thus, according to this embodiment, a heat loss can be reduced, and hence the fuel cell system 100 with higher energy efficiency can be achieved.

Further, in this embodiment, steam can be stably supplied with high responsiveness depending on the operating conditions of the fuel cell system 100. Thus, according to this embodiment, the fuel cell system 100 can be downsized.

In this embodiment, even when dew condensation of the anode exhaust gas F06 occurs in the anode exhaust gas flow passage 302 due to a transient operating state of the fuel cell system 100, dew condensation water can be stored in the dew condensation water storage space 304. Thus, the flow of the anode exhaust gas F06 can be prevented from being obstructed by the dew condensation water. Hence, the occurrence of pulsation in the anode exhaust gas F06 can be suppressed.

In this embodiment, the circulating water F10 can be turned into the steam F11 by using waste heat of the anode exhaust gas F06. Thus, according to this embodiment, the thermal energy of the fuel cell system 100 can be effectively used. Hence, the fuel cell system 100 with high energy efficiency can be achieved.

When the fuel cell system 100 is in a transient operating state, the thermal energy obtained from the anode exhaust gas F06 may be insufficient for the thermal energy that is required as the vaporization heat for the circulating water F10 in some cases. In this embodiment, the thermal energy can be supplemented with high responsiveness by the auxiliary heating device 303 even in the above-mentioned case. Thus, in this embodiment, a wide range of operating conditions of the fuel cell system 100 can be covered.

Further, in this embodiment, when the thermal energy that is required as the vaporization heat for the circulating water F10 is obtained from the anode exhaust gas F06, the auxiliary heating device 303 can be stopped. Thus, energy is not required to be constantly supplied to the auxiliary heating device 303. Hence, according to this embodiment, the fuel cell system 100 with high energy efficiency can be achieved.

Figure 3:
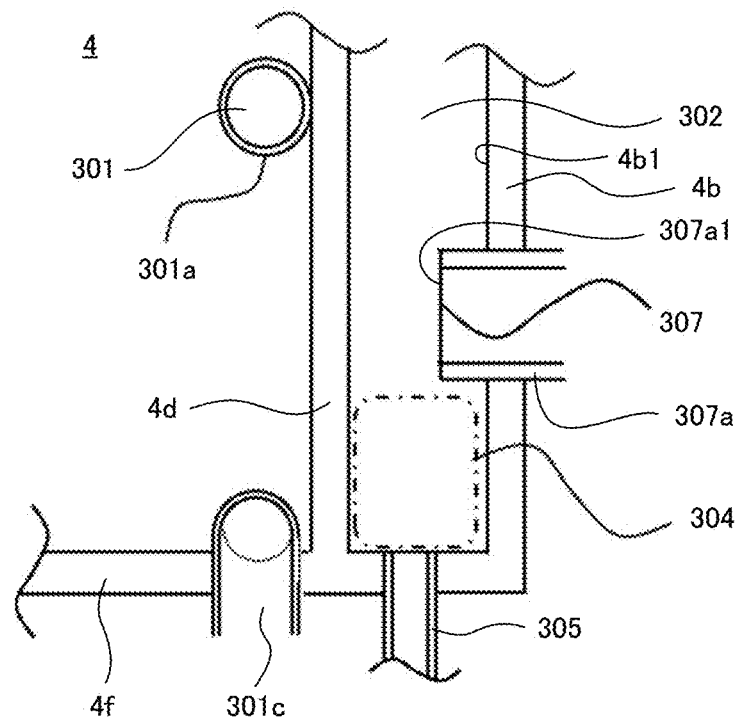
FIG. 3 is a sectional view for illustrating a configuration of an anode exhaust gas flow passage inlet and therearound in a steam generator according to Modification Example 1-1 of the first embodiment.

FIG. 3 is a sectional view for illustrating a configuration of an anode exhaust gas flow passage inlet and therearound in a steam generator according to Modification Example 1-1 of this embodiment. As illustrated in FIG. 3, an inflow pipe 307a has an end surface 307a1. The end surface 307a1 faces an anode exhaust gas flow passage 302. The end surface 307a1 is formed so as to be perpendicular to a pipe axis of the inflow pipe 307a. The end surface 307al is formed as being different from an inner wall surface 4b1 of an outer peripheral wall 4b. In this modification example, the inflow pipe 307a is inserted into the anode exhaust gas flow passage 302. Thus, the end surface 307al protrudes into the anode exhaust gas flow passage 302 with respect to the inner wall surface 4b1. However, the end surface 307al is separate from a partition wall 4d.

An anode exhaust gas F06 flows into the anode exhaust gas flow passage 302 via the inflow pipe 307a, flows upward through the anode exhaust gas flow passage 302, and flows out to an outside of a steam generator 4. When dew condensation occurs in the anode exhaust gas F06, dew condensation water flows down mainly along the inner wall surface 4b1 of the outer peripheral wall 4b and moves into a dew condensation water storage space 304.

In this modification example, the end surface 307a1 of the inflow pipe 307a is formed as being different from the inner wall surface 4b1. Thus, the dew condensation water flowing down along the inner wall surface 4b1 is less liable to intrude into the inflow pipe 307a. Thus, flow of the anode exhaust gas F06 can be prevented from being obstructed by the dew condensation water. Hence, occurrence of pulsation in the anode exhaust gas F06 can be suppressed.

In this modification example, in particular, the end surface 307al of the inflow pipe 307a protrudes into the anode exhaust gas flow passage 302 with respect to the inner wall surface 4b1. Thus, the dew condensation water can be more reliably prevented from intruding into the inflow pipe 307a. Hence, the occurrence of pulsation in the anode exhaust gas F06 can be more reliably prevented.

Figure 4:
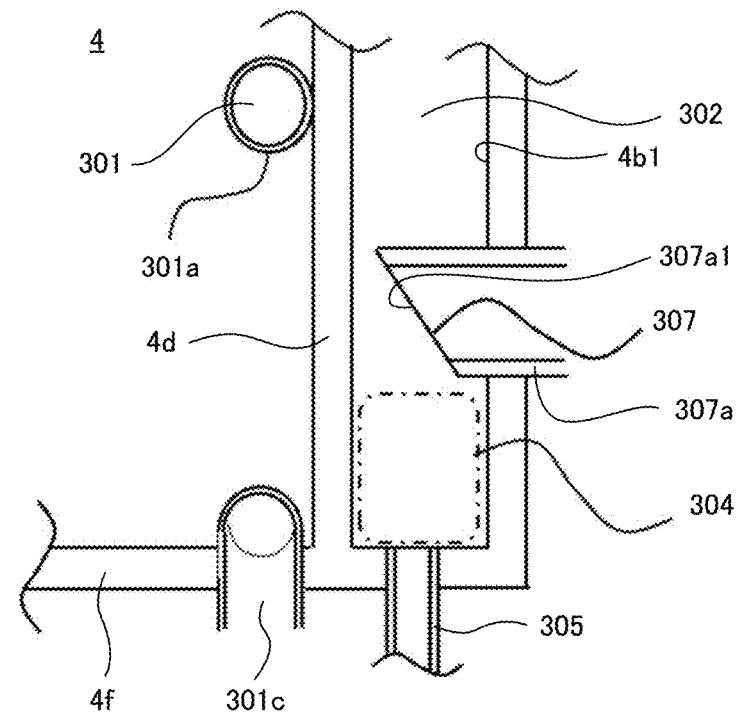
FIG. 4 is a sectional view for illustrating a configuration of an anode exhaust gas flow passage inlet and therearound in a steam generator according to Modification Example 1-2 of the first embodiment.

FIG. 4 is a sectional view for illustrating a configuration of an anode exhaust gas flow passage inlet and therearound in a steam generator according to Modification Example 1-2 of this embodiment. As illustrated in FIG. 4, an end surface 307al of an inflow pipe 307a is not only formed as being different from an inner wall surface 4b1 but also formed obliquely with respect to a pipe axis of the inflow pipe 307a. The end surface 307al is inclined with respect to the inner wall surface 4b1 so as to be farther away from the inner wall surface 4b1 in an upward direction. Thus, in this modification example, dew condensation water is further less liable to intrude into the inflow pipe 307a in comparison to the configuration of Modification Example 1-1. Thus, according to this modification example, flow of an anode exhaust gas F06 can be more reliably prevented from being obstructed by the dew condensation water. Hence, the occurrence of pulsation in the anode exhaust gas F06 can be more reliably prevented.

Figure 5:
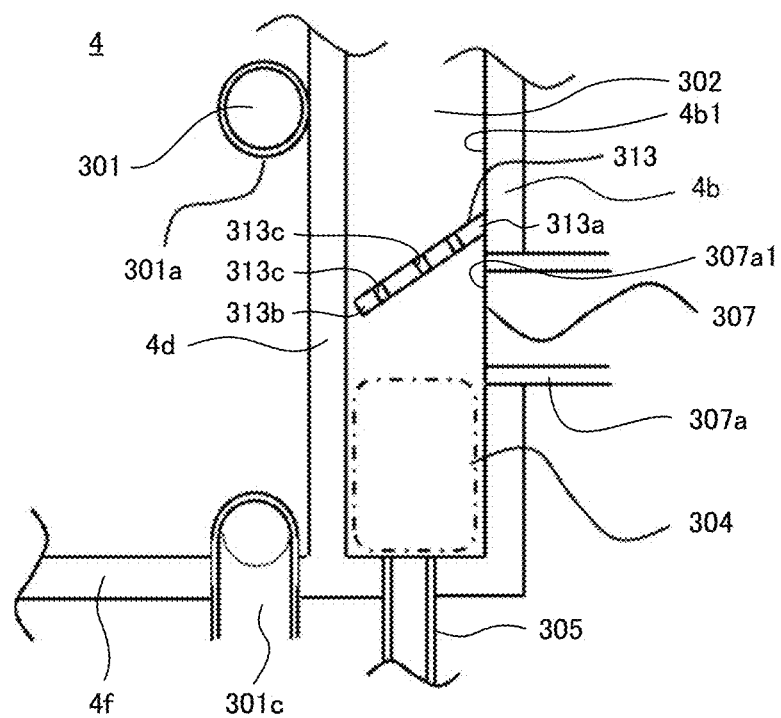
FIG. 5 is a sectional view for illustrating a configuration of an anode exhaust gas flow passage inlet and therearound in a steam generator according to Modification Example 1-3 of the first embodiment.

FIG. 5 is a sectional view for illustrating an anode exhaust flow passage inlet and therearound in a steam generator according to Modification Example 1-3 of this embodiment. As illustrated in FIG. 5, in this modification example, a dew condensation water guiding plate 313 is formed above an anode exhaust gas flow passage inlet 307 inside an anode exhaust gas flow passage 302. One end portion 313a of the dew condensation water guiding plate 313 is joined to an inner wall surface 4b1 at a position above the anode exhaust gas flow passage inlet 307. The dew condensation water guiding plate 313 is inclined so that its height is decreased in a direction away from the inner wall surface 4b1, that is, in a direction closer to the other end portion 313b of the dew condensation water guiding plate 313. A gap is defined between the other end portion 313b of the dew condensation water guiding plate 313 and a partition wall 4d. The other end portion 313b may be joined to the partition wall 4d. An inflow pipe 307a and the anode exhaust gas flow passage inlet 307 of this modification example have the same configurations as those illustrated in FIG. 2.

When dew condensation water flowing down along the inner wall surface 4b1 of an outer peripheral wall 4b reaches the one end portion 313a of the dew condensation water guiding plate 313, the dew condensation water is guided toward the other end portion 313b by the dew condensation water guiding plate 313. The dew condensation water flows toward the other end portion 313b along the inclination of the dew condensation water guiding plate 313 and drops down from the other end portion 313b. The dew condensation water that has dropped down is stored in a dew condensation water storage space 304. Thus, according to this modification example, flow of an anode exhaust gas F06 can be prevented from being obstructed by the dew condensation water. Hence, the occurrence of pulsation in the anode exhaust gas F06 can be prevented.

In this modification example, at least one through hole 313c is formed in the dew condensation water guiding plate 313. Each of the through holes 313c penetrates the dew condensation water guiding plate 313 in a thickness direction of the dew condensation water guiding plate 313. Thus, the through holes 313c serve as a part of a flow passage for the anode exhaust gas F06. Hence, the anode exhaust gas F06 flowing into the anode exhaust gas flow passage 302 easily flows upward. When the flow passage for the anode exhaust gas F06 is ensured sufficiently, the dew condensation water guiding plate 313 is not required to have the through holes 313c.

As described above, the fuel cell system 100 according to this embodiment includes the steam generator 4, the reformer 2, the fuel cell stack 1, and the ejector 9. The steam generator 4 is configured to heat the circulating water F10 to generate the steam F11. The reformer 2 is configured to cause a reaction between the steam F11 and hydrocarbon to generate the reformed gas F05 containing hydrogen. The fuel cell stack 1 has the anode 1a and the cathode 1c. The fuel cell stack 1 is configured to generate electric energy through the electrochemical reaction caused between the reformed gas F05 supplied to the anode 1a and the oxidant F03 supplied to the cathode 1c. The ejector 9 is configured to supply at least one of the raw material F01 containing hydrocarbon or the anode circulating gas F09 obtained by recovering a part of the anode exhaust gas F06 discharged from the anode 1a, to the reformer 2 by using the steam F11 as the driving fluid. The steam generator 4 includes the evaporation flow passage 301, the anode exhaust gas flow passage 302, and the auxiliary heating device 303. The circulating water F10 flows through the evaporation flow passage 301. The anode exhaust gas flow passage 302 is thermally connected to the evaporation flow passage 301, and the anode exhaust gas F06 flows through the anode exhaust gas flow passage 302. The auxiliary heating device 303 heats the circulating water F10. The anode exhaust gas flow passage 302 and the auxiliary heating device 303 are opposed to each other across the evaporation flow passage 301. In this case, the reformer 2 is one example of a reforming part. The circulating water F10 is one example of water.

With the above-mentioned configuration, the circulating water the evaporation flow passage 301 can be heated from both sides by the anode exhaust gas flow passage 302 and the auxiliary heating device 303. Thus, according to this embodiment, a heat loss can be reduced. Hence, the fuel cell system 100 with higher energy efficiency can be achieved.

In the fuel cell system 100 according to this embodiment, the evaporation flow passage 301 extends obliquely with respect to the up-and-down direction. The evaporation flow passage 301 has a down gradient from the upstream side toward the downstream side. With this configuration, the circulating water F10 can be caused to flow into the evaporation flow passage 301 by gravity.

In the fuel cell system 100 according to this embodiment, the anode exhaust gas flow passage 302 extends in the up-and-down direction. The steam generator 4 includes the outer peripheral wall 4b, the inflow pipe 307a, and the outflow pipe 308a. The outer peripheral wall 4b extends in the up-and-down direction. The outer peripheral wall 4b defines the anode exhaust gas flow passage 302. The inflow pipe 307a penetrates the outer peripheral wall 4b and is connected to the anode exhaust gas flow passage 302. The anode exhaust gas F06 flows in from the inflow pipe 307a. The outflow pipe 308a is connected to the anode exhaust gas flow passage 302 at a position above the inflow pipe 307a. The anode exhaust gas F06 flows out from the outflow pipe 308a. The dew condensation water storage space 304 that stores the dew condensation water is defined below the inflow pipe 307a in the anode exhaust gas flow passage 302. In this case, the outer peripheral wall 4b is one example of a flow passage wall.

With the configuration described above, the blockage of the anode exhaust gas flow passage 302 with the dew condensation water can be suppressed. Hence, the occurrence of pulsation in the anode exhaust gas F06 can be suppressed.

In the fuel cell system 100 according to this embodiment, the inflow pipe 307a has the end surface 307a1 that faces the anode exhaust gas flow passage 302. The end surface 307a1 protrudes into the anode exhaust gas flow passage 302 with respect to the inner wall surface 4b1 of the outer peripheral wall 4b. With this configuration, the dew condensation water can be prevented from intruding into the inflow pipe 307a. Hence, the occurrence of pulsation in the anode exhaust gas F06 can be prevented.

In the fuel cell system 100 according to this embodiment, the dew condensation water guiding plate 313 that guides the dew condensation water is provided above the inflow pipe 307a in the anode exhaust gas flow passage 302. With this configuration, the dew condensation water can be prevented from intruding into the inflow pipe 307a. Hence, the occurrence of pulsation in the anode exhaust gas F06 can be prevented.

In the fuel cell system 100 according to this embodiment, the auxiliary heating device 303 includes the electric heaters. With this configuration, the output of the auxiliary heating device 303 can easily be adjusted.

The fuel cell system 100 according to this embodiment further includes the anode exhaust gas temperature sensor 21 and the control unit 90. The anode exhaust gas temperature sensor 21 detects the temperature of the anode exhaust gas F06. The control unit 90 controls the auxiliary heating device 303 based on the temperature of the anode exhaust gas F06.

With this configuration, even when the thermal energy obtained from the anode exhaust gas F06 is insufficient for the thermal energy that is required as the vaporization heat for the circulating water F10, the thermal energy can be supplemented by the auxiliary heating device 303.

The fuel cell system 100 according to this embodiment further includes the steam temperature sensor 20 and the control unit 90. The steam temperature sensor 20 detects the temperature of the steam F11. The control unit 90 controls the auxiliary heating device 303 based on the temperature of the steam F11.

With this configuration, even when the thermal energy obtained from the anode exhaust gas F06 is insufficient for the thermal energy that is required as the vaporization heat for the circulating water F10, the thermal energy can be supplemented by the auxiliary heating device 303.

Second Embodiment

Figure 6:
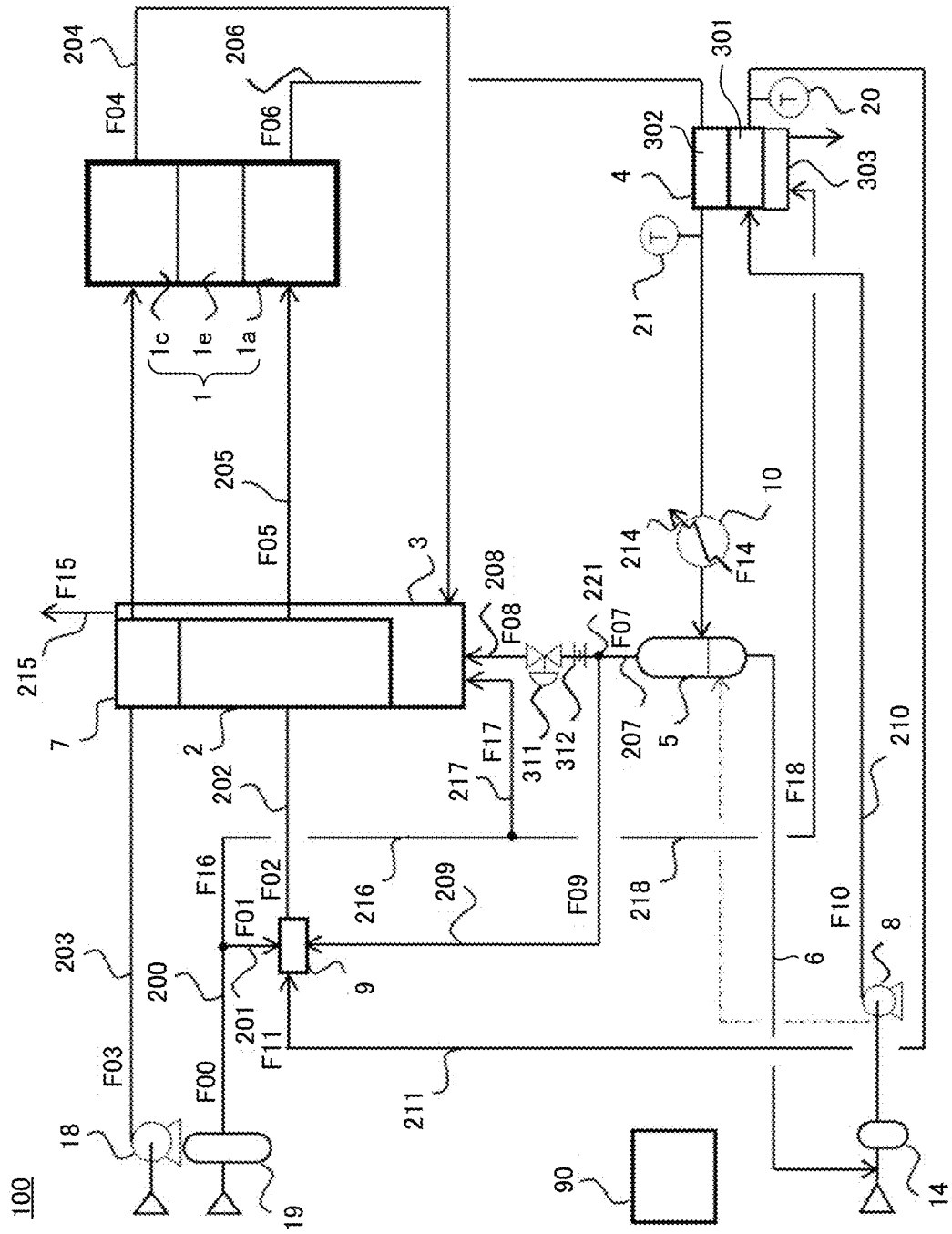
FIG. 6 is a system diagram for illustrating a configuration of a fuel cell system according to a second embodiment.
Figure 7:
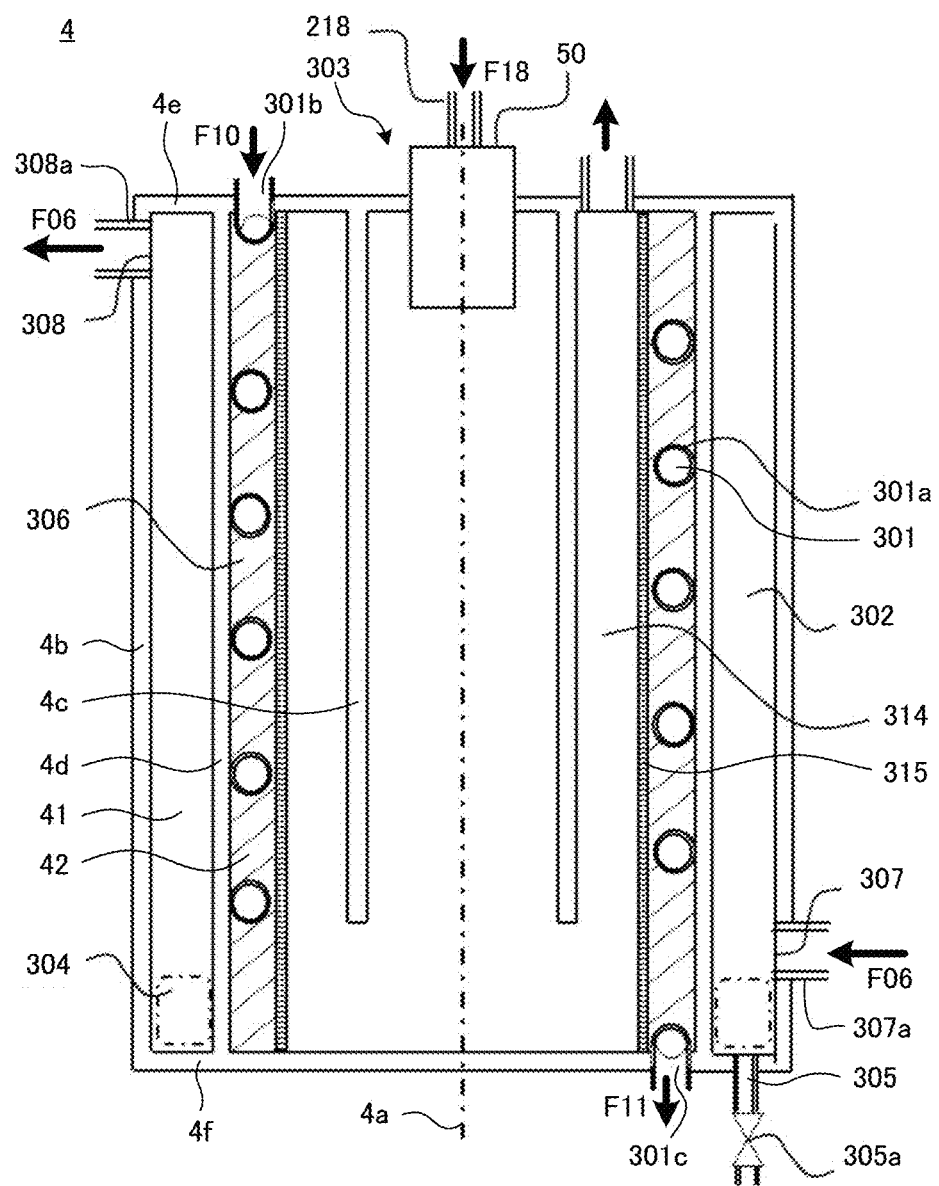
FIG. 7 is a sectional view for illustrating an internal structure of a steam generator in the fuel cell system according to the second embodiment.

A fuel cell system according to a second embodiment is described. FIG. 6 is a system diagram for illustrating a configuration of the fuel cell system according to this embodiment. FIG. 7 is a sectional view for illustrating an internal structure of a steam generator in the fuel cell system according to this embodiment. This embodiment is different from the first embodiment in that an auxiliary heating device 303 includes an auxiliary combustor 50 and a combustion exhaust gas flow passage 314. Components having functions and actions similar to those of the components in the first embodiment are denoted by the same reference symbols, and description thereof is omitted.

As illustrated in FIG. 6 and FIG. 7, the auxiliary combustor 50 is provided to an upper part of a steam generator 4. The auxiliary combustor 50 forms a part of the auxiliary heating device 303. The auxiliary combustor 50 is arranged on a center axis 4a of the steam generator 4. The auxiliary combustor 50 is opposed to an anode exhaust gas flow passage 302 across an evaporation flow passage 301.

An auxiliary combustion fuel line 216 branches into an auxiliary combustion fuel line 217 and an auxiliary combustion fuel line 218. The auxiliary combustion fuel line 217 is connected to a combustor 3. The auxiliary combustion fuel line 218 is connected to the auxiliary combustor 50. An auxiliary combustion fuel F16 flowing through the auxiliary combustion fuel line 216 is split into an auxiliary combustion fuel F17 and an auxiliary combustion fuel F18. The auxiliary combustion fuel F17 flows through the auxiliary combustion fuel line 217 and is supplied to the combustor 3. The auxiliary combustion fuel F18 flows through the auxiliary combustion fuel line 218 and is supplied to the auxiliary combustor 50.

The combustion exhaust gas flow passage 314 is provided between the auxiliary combustor 50 and an outside of the steam generator 4. The combustion exhaust gas flow passage 314 is arranged on an inner periphery side of an inner peripheral space 42. The combustion exhaust gas flow passage 314 and the inner peripheral space 42 are separated from each other by a partition wall 315. The partition wall 315 is formed in a cylindrical shape having a center axis 4a as a center. The combustion exhaust gas flow passage 314 is thermally connected to the evaporation flow passage 301 via the partition wall 315, a heat transfer promoting member 306, and a heat transfer pipe 301a.

The combustion exhaust gas flow passage 314 forms a part of the auxiliary heating device 303. The combustion exhaust gas flow passage 314 is opposed to the anode exhaust gas flow passage 302 across the evaporation flow passage 301.

In the auxiliary combustor 50, the auxiliary combustion fuel F18 and a combustion-supporting gas such as air are ignited by, for example, an ignitor to be combusted to thereby generate a combustion exhaust gas having a high temperature. The combustion exhaust gas having a high temperature passes through the combustion exhaust gas flow passage 314 and provides thermal energy to a circulating water F10 flowing through the evaporation flow passage 301. The combustion exhaust gas that has provided the thermal energy to the circulating water F10 is discharged to the outside of the steam generator 4. The amount of heat of the combustion exhaust gas is controlled by adjusting a flow rate of the auxiliary combustion fuel F18. Other operations are similar to those of the fuel cell system according to the first embodiment.

Regarding the supply of the combustion-supporting gas to the auxiliary combustor 50, the auxiliary combustor 50 may have such a structure that atmospheric air is introduced through natural aspiration. In this case, it becomes difficult to change a combustion air ratio. However, the structure of the auxiliary combustor 50 is simplified. Further, air may be supplied to the auxiliary combustor 50 through an air supply line that is additionally provided. In this case, any suitable combustion air ratio is obtained by controlling a flow rate ratio of the auxiliary combustion fuel F18 and air. Thus, an adiabatic flame temperature can be controlled, and hence the amount of transfer of thermal energy to the circulating water F10 can be more precisely controlled.

According to this embodiment, in addition to the effects obtained in the first embodiment, the following effects are obtained. Specifically, in this embodiment, the auxiliary combustor 50 is used in the auxiliary heating device 303. Thus, thermal energy that is required for the steam generator 4 can be generated by using the raw material F00 that is required for the fuel cell stack 1. Thus, efficiency of the fuel cell system 100 can be enhanced.

Further, in this embodiment, the auxiliary combustor 50 is used in the auxiliary heating device 303. Thus, power consumption at the time of activation of the fuel cell system 100, in particular, can be reduced in comparison to that with the configuration in which an electric heater is used in the auxiliary heating device 303. Thus, the fuel cell system 100 can also be applied to an emergency power source. An operation of the fuel cell system 100 at the time of activation is described in a third embodiment described later.

As described above, in the fuel cell system 100 according to this embodiment, the auxiliary heating device 303 includes the auxiliary combustor 50 and the combustion exhaust gas flow passage 314 through which the combustion exhaust gas generated in the auxiliary combustor 50 flows. With this configuration, power consumption in the auxiliary heating device 303 can be reduced.

Third Embodiment

Figure 8:
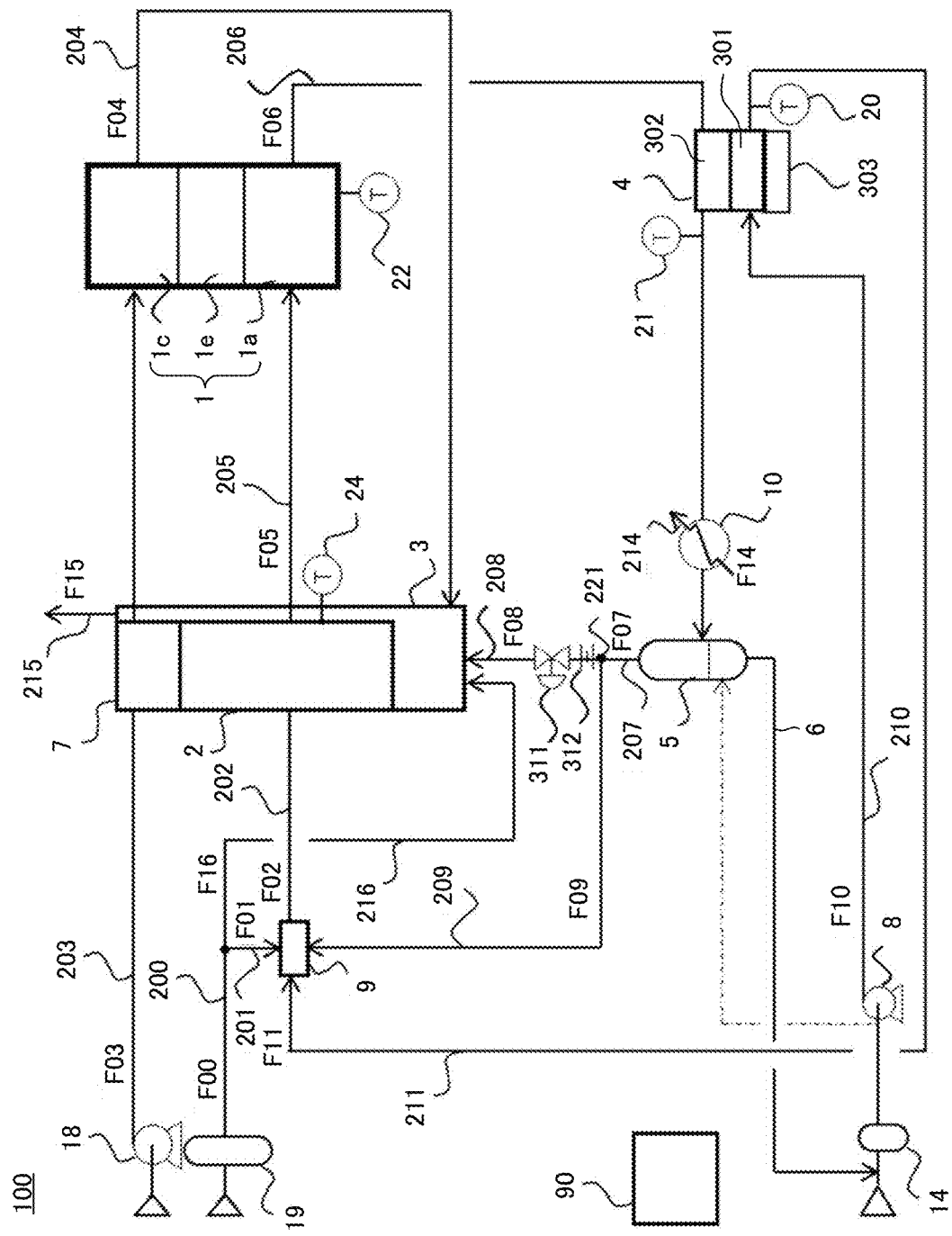
FIG. 8 is a system diagram for illustrating a configuration of a fuel cell system according to a third embodiment.

A fuel cell system according to a third embodiment and a method of operating the fuel cell system are described. This embodiment mainly relates to an operation of a fuel cell system 100 at the time of activation. FIG. 8 is a system diagram for illustrating a configuration of the fuel cell system according to this embodiment.

As illustrated in FIG. 8, a stack temperature sensor 22 is provided to a fuel cell stack 1. The stack temperature sensor 22 is configured to detect a reference temperature of the fuel cell stack 1. A reformer temperature sensor 24 is provided to a reformer 2. The reformer temperature sensor 24 is configured to detect a reference temperature of the reformer 2. Other configurations are similar to those in the first embodiment, which are illustrated in FIG. 1 and FIG. 2.

An operation of the fuel cell system 100, which is executed by control of a control unit 90 at the time of activation of the fuel cell system 100, is described. First, an oxidant F03 discharged from an air blower 18 flows through an oxidant line 203, passes through an oxidant heat exchanger 7 and a cathode 1c, and is supplied as a cathode exhaust gas F04 to a combustor 3. Further, a part of a raw material F00 flows through an auxiliary combustion fuel line 216 and is supplied as an auxiliary combustion fuel F16 to the combustor 3. In the combustor 3, a cathode exhaust gas F04 and the auxiliary combustion fuel F16 are ignited by, for example, an ignitor to be combusted to thereby generate a combustion gas.

The combustion gas generated in the combustor 3 raises temperatures of the reformer 2 and the oxidant heat exchanger 7, passes through a combustion exhaust gas line 215, and is discharged as a combustion exhaust gas F15. The oxidant F03 that has been heated in the oxidant heat exchanger 7 is supplied to the cathode 1c and raises a temperature of the fuel cell stack 1 with sensible heat of the oxidant F03 itself.

Energization of the auxiliary heating device 303 is started in parallel to the above-mentioned process. In this case, it is assumed that the auxiliary heating device 303 according to this embodiment is an electric heater. When the auxiliary heating device 303 is energized, a temperature of a steam generator 4 is raised.

When each of the temperature of the fuel cell stack 1 and the temperature of the reformer 2 is raised to a temperature at which dew condensation of steam does not occur, for example, 150° C., a water pump 8 is activated to supply a circulating water F10 to the steam generator 4. The circulating water F10 flows downward through an evaporation flow passage 301 from its upper part by a discharge pressure of the water pump 8 and gravity. The circulating water F10 flowing through the evaporation flow passage 301 receives heat from the auxiliary heating device 303 and is evaporated into steam F11. The steam F11 is supplied as a fuel gas F02, which is used at the time of activation, to the reformer 2 and an anode 1a by an ejector 9.

An anode exhaust gas F06 discharged from the anode 1a flows upward through an anode exhaust gas flow passage 302 of the steam generator 4 from its lower part and flows out from an anode exhaust gas flow passage outlet 308.

During a temperature rising process of the steam generator 4, the anode exhaust gas F06 is in a steam rich state. When the anode exhaust gas flow passage 302 has a low temperature part, dew condensation of the steam contained in the anode exhaust gas F06 occurs. However, even when dew condensation of the steam contained in the anode exhaust gas F06 occurs, dew condensation water is stored in a dew condensation water storage space 304 defined in a lower part of the anode exhaust gas flow passage 302 and is discharged via a dew condensation water discharge pipe 305.

Further, when the temperature of the reformer 2 rises to a temperature at which hydrogen can be generated through a reforming reaction caused by a reforming catalyst that is supplied inside, for example, to 450° C., supply of a raw material F01 through a raw material line 200 and a reforming raw material line 201 is started. A flow rate of the raw material F01 at the time of start of the supply is controlled in consideration of S/C. A value of S/C under a rated operation state falls within a range of, for example, from 2.5 to 3.5. Meanwhile, the flow rate of the raw material F01 at the time of start of the supply is set so that the value of S/C is larger than the value of S/C under the rated operation state. The reformer 2 has a transient temperature distribution at the time of activation. The flow rate of the raw material F01 at the time of start of the supply is set to, for example, about 8.0 in value of S/C so as to prevent deposition of carbon (C) in the reformer 2 due to the temperature distribution. After that, the flow rate of the steam F11 and the flow rate of the raw material F01 are suitably controlled.

The supply of the raw material F01 is started before the temperature of the fuel cell stack 1 rises to a temperature at which an oxidation reaction of component members of the fuel cell stack 1 proceeds, for example, 300° C. Specifically, the supply of the raw material F01 is started under temperature conditions that the temperature of the reformer 2 is 450° C. or higher and the temperature of the fuel cell stack 1 is 300° C. or lower. In order to achieve the temperature conditions, a flow rate of the auxiliary combustion fuel F16 supplied to the combustor 3 and a flow rate of the oxidant F03 supplied as the cathode exhaust gas F04 to the combustor 3 are adjusted to thereby control a combustion temperature of the combustor 3 and input energy to the combustor 3.

The flow rates of the oxidant F03, the raw material F01, and the steam F11, which are gases required for a cell reaction, are set to predetermined flow rates. The temperature of the fuel cell stack 1 is raised to a temperature at which power can be generated, for example, 600° C. After the temperature of the fuel cell stack 1 is raised to the temperature at which power can be generated, the flow rates of the oxidant F03, the raw material F01, and the steam F11 are controlled to be the predetermined flow rates. The power generation in the fuel cell stack 1 is started by a method such as current control or power control in parallel to the above-mentioned control. Then, the fuel cell system 100 is brought into a predetermined rated operation state.

As a rise in temperature of the fuel cell stack 1 proceeds, a flow rate of the anode exhaust gas F06 increases and a temperature of the anode exhaust gas F06 rises. Thus, enthalpy of the anode exhaust gas F06 increases. Hence, thermal energy provided from the anode exhaust gas F06 to the circulating water F10 increases in the steam generator 4.

The control unit 90 controls the auxiliary heating device 303 based on the temperature of the anode exhaust gas F06, which is detected by an anode exhaust gas temperature sensor 21. Specifically, the control unit 90 controls the auxiliary heating device 303 so that a heat generation amount of the auxiliary heating device 303 decreases as the temperature of the anode exhaust gas F06 rises. Thus, as the temperature of the anode exhaust gas F06 rises, the heat generation amount of the auxiliary heating device 303 decreases. Hence, thermal energy can be prevented from being provided more than required to the circulating water F10. In this manner, the thermal energy provided to the circulating water F10 is adjusted.

Alternatively, the control unit 90 may control the auxiliary heating device 303 based on a temperature of the steam F11, which is detected by a steam temperature sensor 20. Specifically, the control unit 90 controls the auxiliary heating device 303 so that the heat generation amount of the auxiliary heating device 303 decreases as the temperature of the steam F11 rises. Even in this manner, thermal energy can be prevented from being provided more than required to the circulating water F10.

The anode exhaust gas F06 that has passed through the steam generator 4 further provides thermal energy to a cooling medium F14 flowing through a heat recovery line 214 in a heat recovery cooler 10. Thus, the temperature of the anode exhaust gas F06 flowing into a water separator 5 is decreased to a predetermined temperature that is equal to or lower than a dew point.

Moisture contained in the anode exhaust gas F06 is liquefied in the water separator 5 based on a saturated steam pressure at the temperature of the anode exhaust gas F06. The liquefied moisture turns into water droplets, and the water droplets are separated from the anode exhaust gas F06 and are stored in a lower part of the water separator 5.

Meanwhile, the anode exhaust gas F06 from which the moisture has been removed in the water separator 5 flows out as an anode recovered gas F07 from the water separator 5 and passes through the anode recovered gas line 207 to reach a recovery branch portion 221. The anode recovered gas F07 is separated at the branch portion 221 into a recycled combustion gas F08 that flows through a recycled combustion gas line 208 and an anode circulating gas F09 that flows through an anode circulating gas line 209. The recycled combustion gas F08 passes through the recycled combustion gas line 208 and is supplied to the combustor 3.

At the time of activation of the fuel cell system 100, the auxiliary combustion fuel F16 supplied through the auxiliary combustion fuel line 216 and the cathode exhaust gas F04 supplied through a cathode exhaust gas line 204 are mainly combusted in the combustor 3. When the supply of the raw material F01 is started and the flow rate of the raw material F01 is increased, a flow rate of the recycled combustion gas F08 increases. Thus, a combustion fuel supplied to the combustor 3 increases. Accordingly, after the supply of the raw material F01 is started, the flow rate of the auxiliary combustion fuel F16, a flow rate distribution ratio of the recycled combustion gas F08 at the recovery branch portion 221, and the flow rate of the oxidant F03 are suitably controlled.

In this embodiment, the anode recovered gas F07 flowing through the anode recovered gas line 207 is split at the recovery branch portion 221 into the recycled combustion gas F08 and the anode circulating gas F09. However, flow of the anode recovered gas F07 is not limited thereto. For example, at the time of activation of the fuel cell system 100, all the anode recovered gas F07 flowing through the anode recovered gas line 207 may be caused to flow as the recycled combustion gas F08 through the recycled combustion gas line 208.

In this embodiment, the auxiliary heating device 303 is controlled by the control unit 90 so that the supply of the steam F11 to the reformer 2 and the anode 1a is started within a specific period. The above-mentioned specific period is a period after the temperature of the fuel cell stack 1 rises to a first temperature and before the temperature of the fuel cell stack 1 rises to a second temperature. The first temperature is a temperature at which dew condensation of steam does not occur inside the fuel cell stack 1, for example, 150° C. The second temperature is a temperature at which the oxidation reaction of the component members of the fuel cell stack 1 proceeds, for example, 300° C.

In this embodiment, at the time of activation of the fuel cell system 100, thermal energy that is required to generate the steam F11 at a required flow rate is provided from the auxiliary heating device 303 to the evaporation flow passage 301. When a rise in temperature of the fuel cell system 100 proceeds, thermal energy provided from the anode exhaust gas flow passage 302 to the evaporation flow passage 301 increases. As a result, a heat generation amount of the auxiliary heating device 303 is decreased by the control of the control unit 90. Thus, the thermal energy that is required to generate the steam F11 is provided from both of the auxiliary heating device 303 and the anode exhaust gas flow passage 302 to the evaporation flow passage 301. When the fuel cell system 100 is brought into the rated operation state, the thermal energy that is provided from the anode exhaust gas flow passage 302 to the evaporation flow passage 301 further increases. Thus, the auxiliary heating device 303 is stopped by the control of the control unit 90. In this manner, the thermal energy that is required to generate the steam F11 is provided from the anode exhaust gas flow passage 302 to the evaporation flow passage 301.

As described above, in this embodiment, when the fuel cell system 100 is activated, the temperatures can be raised continuously while a required gas atmosphere is being formed. Thus, according to this embodiment, stable generation of the steam with less pulsation can be achieved depending on a temperature rise condition for the fuel cell system 100. Further, according to this embodiment, the fuel cell system 100 with a high degree of freedom and high energy efficiency can be achieved.

Figure 9:
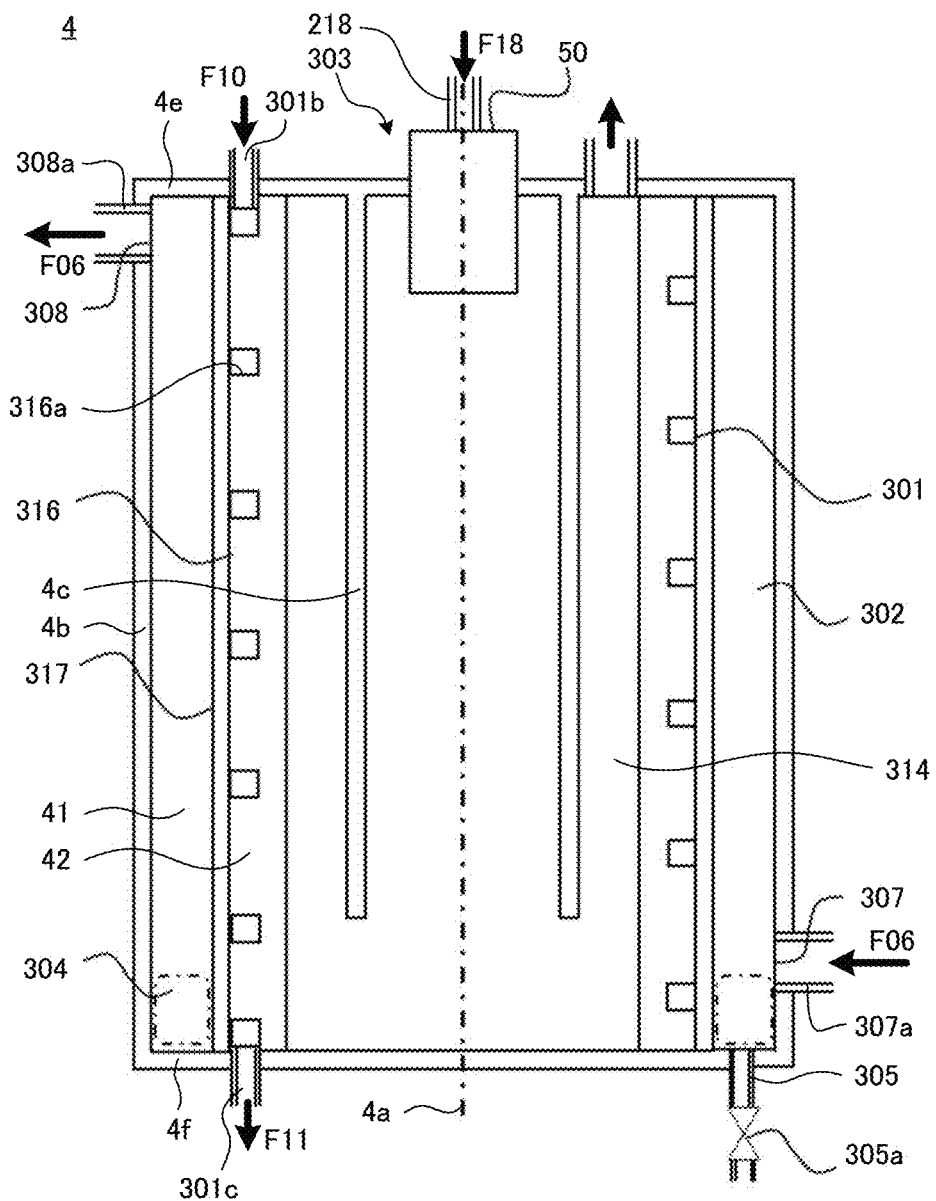
FIG. 9 is a sectional view for illustrating an internal structure of a steam generator according to Modification Example 3-1 of the third embodiment.

FIG. 9 is a sectional view for illustrating an internal structure of a steam generator according to Modification Example 3-1 of this embodiment. As illustrated in FIG. 9, a steam generator 4 includes a first flow passage member 316 and a second flow passage member 317.

The first flow passage member 316 is formed in a cylindrical shape having a center axis 4a as a center. A groove 316a is formed in an outer peripheral surface of the first flow passage member 316. The groove 316a extends helically with the center axis 4a as an axis of helix.

The second flow passage member 317 is formed in a cylindrical shape having the center axis 4a as a center. The second flow passage member 317 has an inner diameter that is equal to an outer diameter of the first flow passage member 316. An inner peripheral surface of the second flow passage member 317 is joined to an outer peripheral surface of the first flow passage member 316.

An evaporation flow passage 301 is defined inside the groove 316a. An evaporation flow passage inlet 301b is formed at an upper end portion of the evaporation flow passage 301. An evaporation flow passage outlet 301c is formed at a lower end portion of the evaporation flow passage 301.

The first flow passage member 316 and the second flow passage member 317 are arranged on an outer periphery side of a combustion exhaust gas flow passage 314 and an inner periphery side of an anode exhaust gas flow passage 302. An inner peripheral surface of the first flow passage member 316 faces the combustion exhaust gas flow passage 314. The evaporation flow passage 301 is thermally connected to the combustion exhaust gas flow passage 314 via the first flow passage member 316. An outer peripheral surface of the second flow passage member 317 faces the anode exhaust gas flow passage 302. The evaporation flow passage 301 is thermally connected to the anode exhaust gas flow passage 302 via the second flow passage member 317.

Thermal energy is provided from a combustion exhaust gas flowing through the combustion exhaust gas flow passage 314 to a circulating water F10 flowing through the evaporation flow passage 301 via the first flow passage member 316. Further, thermal energy is provided from an anode exhaust gas F06 flowing through the anode exhaust gas flow passage 302, to the circulating water F10 via the second flow passage member 317.

According to this embodiment, thermal energy is transferred to the circulating water F10 via a single member from both of the combustion exhaust gas flowing through the combustion exhaust gas flow passage 314 and the anode exhaust gas F06 flowing through the anode exhaust gas flow passage 302. Thus, heat resistance is decreased in both of the heat transfer passages, and hence a heat transfer characteristic of the steam generator 4 can be improved. Accordingly, the steam generator 4 having a small size with high responsiveness can be achieved. Hence, the fuel cell system 100 having high performance can be achieved.

As described above, the fuel cell system 100 according to this embodiment further includes the stack temperature sensor 22 and the control unit 90. The stack temperature sensor 22 detects the temperature of the fuel cell stack 1. When the fuel cell system 100 is activated, the control unit 90 controls the auxiliary heating device 303 so that the supply of the steam F11 to the reformer 2 is started within the specific period. The specific period is a period after the temperature of the fuel cell stack 1 rises to the first temperature and before the temperature of the fuel cell stack 1 rises to the second temperature that is higher than the first temperature.

In the fuel cell system 100 according to this embodiment, the first temperature is 150° C., and the second temperature is 300° C.

With the configuration described above, occurrence of dew condensation inside the fuel cell stack 1 can be prevented. Further, with the configuration described above, the supply of the steam F11 can be started before the oxidation reaction of the component members of the fuel cell stack 1 proceeds.

Fourth Embodiment

A fuel cell system according to a fourth embodiment and a method of operating the fuel cell system are described. This embodiment mainly relates to an operation which is performed when a fuel cell system 100 is stopped. A configuration of the fuel cell system 100 according to this embodiment is similar to the configuration of the fuel cell system 100 according to the third embodiment, which is illustrated in FIG. 8. Specifically, similarly to the fuel cell system 100 according to the third embodiment, the fuel cell system 100 according to this embodiment includes a stack temperature sensor 22 and a reformer temperature sensor 24.

An operation of the fuel cell system 100, which is executed by control of a control unit 90 when the fuel cell system 100 is stopped, is described. When the fuel cell system 100 is stopped, the control unit 90 decreases an output of the fuel cell stack 1 to stop power generation of the fuel cell stack 1. Further, the control unit 90 decreases a supply amount of a raw material F01 in parallel to a decrease in output of the fuel cell stack 1 or after the power generation of the fuel cell stack 1 is stopped, and stops the supply of the raw material F01. The control unit 90 starts operating an auxiliary heating device 303 simultaneously with start of decreasing the supply amount of the raw material F01. In this case, it is assumed that the auxiliary heating device 303 according to this embodiment is an electric heater. When a flow rate of the raw material F01 becomes smaller than a threshold value, the control unit 90 fully closes a recycled combustion gas flow rate control valve 311. Thus, supply of a recycled combustion gas F08 to a combustor 3 is interrupted, and combustion in the combustor 3 is stopped.

A water pump 8 maintains an operating state. A circulating water F10 is supplied to an evaporation flow passage 301 of a steam generator 4 by the water pump 8. An anode exhaust gas F06 is supplied to an anode exhaust gas flow passage 302 of the steam generator 4 via the anode exhaust gas flow passage 302. Thermal energy is provided to the circulating water F10 in the evaporation flow passage 301 from the anode exhaust gas flow passage 302 and the auxiliary heating device 303. As a result, steam F11 can be stably generated in the steam generator 4.

In this case, a fuel gas F02 flowing through a fuel gas line 202 is the steam F11 and an anode circulating gas F09. The fuel gas F02 causes a slight $CH_4$ generating reaction in a reformer 2 and the fuel cell stack 1 along with a decrease in temperature. However, most of an $H_2$ component still remains and turns into the anode exhaust gas F06, which is then supplied to the steam generator 4. The anode exhaust gas F06 flowing out from the steam generator 4 is cooled in a heat recovery cooler 10 and flows into a water separator 5. Steam in the anode exhaust gas F06 condenses into condensate water and is separated from a gas component of the anode exhaust gas F06 in the water separator 5.

The gas component of the anode exhaust gas F06 flows out from the water separator 5 and flows as an anode recovered gas F07 into an anode recovered gas line 207. The recycled combustion gas flow rate control valve 311 is fully closed. Thus, all the anode recovered gas F07 serves as an anode circulating gas F09.

The steam F11 generated in the steam generator 4 serves as a driving fluid in an ejector 9 to suck the anode circulating gas F09. The steam F11 and the anode circulating gas F09 flow out as the fuel gas F02 from the ejector 9. The fuel gas F02 passes through a fuel gas line 202 and is supplied to the reformer 2 and the fuel cell stack 1. Specifically, in the fuel cell system 100 at this time, a gas in an anode line is circulated while generation, supply, and condensation of steam are repeated.

A flow rate of an oxidant F03 supplied to a cathode 1c is set to an appropriate flow rate depending on a condition such as temperature decreasing speeds of the fuel cell stack 1 and the reformer 2. A temperature of the fuel cell stack 1 and a temperature of the reformer 2 are decreased through transfer of sensible heat, which is caused by the flow of the oxidant F03.

After the temperature of the fuel cell stack 1 is decreased to a temperature at which an anode 1a is not oxidized and the temperature of the reformer 2 is decreased to a temperature at which a reforming catalyst is not oxidized, the anode line is purged with the oxidant F03 or a closed loop of the anode line is exposed to atmosphere. The temperature of the fuel cell stack 1 is acquired based on a detection signal from the stack temperature sensor 22. The temperature of the reformer 2 is acquired based on a detection signal from the reformer temperature sensor 24. The anode line is purged by introducing the oxidant F03 into the fuel gas line 202 under control of the control unit 90. A channel for introducing the oxidant F03 into the fuel gas line 202 is not illustrated in FIG. 8. The exposure of the closed loop of the anode line to the atmosphere is performed by opening the recycled combustion gas flow rate control valve 311 under control of the control unit 90.

When a raw material F00 does not adversely affect the reforming catalyst for the reformer 2 and the anode 1a, the raw material F00 may be introduced into the fuel gas line 202 so that the purging is performed with the raw material F00. Further, after being purged with the oxidant F03 or the raw material F00, the anode line may be isolated from the atmosphere to form a closed loop.

In this case, the control unit 90 stops the auxiliary heating device 303 and the water pump 8. Thus, the generation of steam is stopped. Through the above-mentioned procedure, the fuel cell system 100 is stopped.

In this embodiment, when the fuel cell system 100 is stopped, steam at a required flow rate can be generated by the steam generator 4 without activation of the combustor 3. The generated steam is circulated through the anode line by a driving force of the ejector 9. Specifically, the steam serves as a medium, and a gas composition immediately after the fuel cell system 100 is stopped is substantially maintained. Thus, the temperature of the reformer 2 and the temperature of the fuel cell stack 1 can be decreased in a reducing atmosphere by the fuel gas F02 and a reformed gas F05. Thus, the temperatures of the devices of the fuel cell system 100 can be efficiently decreased while a gas atmosphere in each of the lines of the fuel cell system 100 is maintained.

As described above, the fuel cell system 100 according to this embodiment further includes the water separator 5, the recovery branch portion 221, and the recycled combustion gas flow rate control valve 311. The water separator 5 is configured to separate the anode exhaust gas F06 into the condensate water and the anode recovered gas F07. The recovery branch portion 221 is configured to split the anode recovered gas F07 into the recycled combustion gas F08 to be supplied to the combustor 3 that is thermally connected to the reformer 2, and the anode circulating gas F09. The recycled combustion gas flow rate control valve 311 is configured to interrupt the supply of the recycled combustion gas F08 to the combustor 3. When the fuel cell system 100 is stopped, the control unit 90 stops the generation of electric energy in the fuel cell stack 1, closes the recycled combustion gas flow rate control valve 311, controls the auxiliary heating device 303 to ensure the flow rate of the steam F11, and decreases the temperatures of the reformer 2 and the fuel cell stack 1. In this case, the recycled combustion gas flow rate control valve 311 is one example of an interrupting portion.

With this configuration, the temperatures of the devices of the fuel cell system 100 can be efficiently decreased while the gas atmosphere in each of the lines of the fuel cell system 100 is maintained.

The fuel cell system 100 according to this embodiment further includes the anode exhaust gas temperature sensor 21 that detects the temperature of the anode exhaust gas F06. The control unit 90 controls the auxiliary heating device 303 based on the temperature of the anode exhaust gas F06. With this configuration, thermal energy can be prevented from being provided more than required to the circulating water F10.

The fuel cell system 100 according to this embodiment further includes the steam temperature sensor 20 that detects the temperature of the steam F11. The control unit 90 controls the auxiliary heating device 303 based on the temperature of the steam F11. With this configuration, thermal energy can be prevented from being provided more than required to the circulating water F10.

In the fuel cell system 100 according to this embodiment, the control unit 90 may open the recycled combustion gas flow rate control valve 311 after the temperature of the fuel cell stack 1 is decreased to the above-mentioned second temperature. Further, the control unit 90 may introduce the oxidant F03 or the raw material F00 into the anode line passing through the reformer 2 and the anode 1a, for example, the fuel gas line 202, after the temperature of the fuel cell stack 1 is decreased to the above-mentioned second temperature.

Fifth Embodiment

Figure 10:
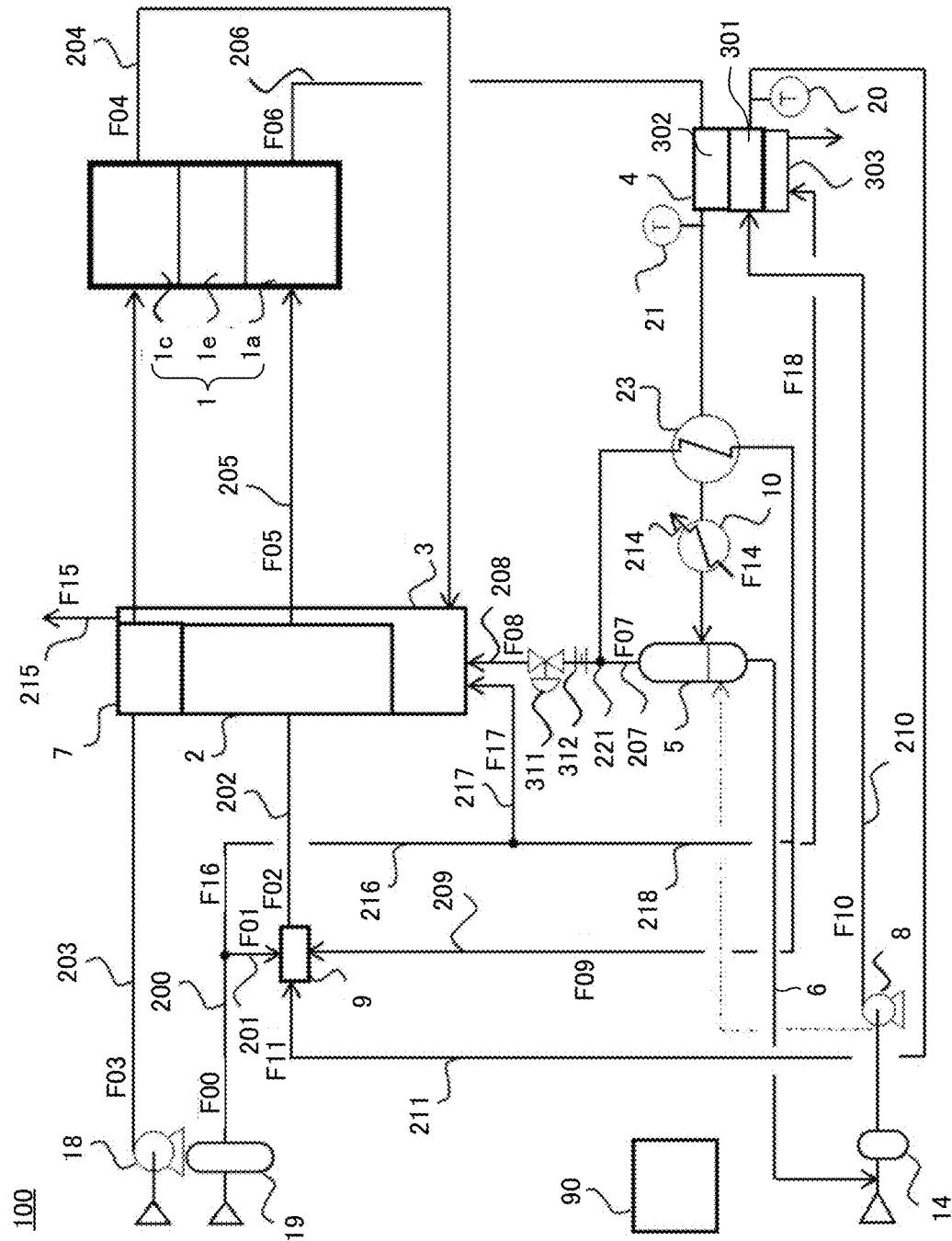
FIG. 10 is a system diagram for illustrating a configuration of a fuel cell system according to a fourth embodiment.

A fuel cell system according to a fifth embodiment and a method of operating the fuel cell system are described. FIG. 10 is a system diagram for illustrating a configuration of the fuel cell system according to this embodiment.

As illustrated in FIG. 10, a circulation heat exchanger 23 is provided to a fuel cell stack 1. The circulation heat exchanger 23 is arranged between a steam generator 4 and a heat recovery cooler 10 in an anode exhaust gas line 206 and between a recovery branch portion 221 and an ejector 9 in an anode circulating gas line 209. Other configurations are similar to those in the second embodiment, which are illustrated in FIG. 6.

In the circulation heat exchanger 23, heat is exchanged between an anode exhaust gas F06 flowing through the anode exhaust gas line 206 and an anode circulating gas F09 flowing through the anode circulating gas line 209. The anode circulating gas F09 obtains thermal energy from the anode exhaust gas F06 flowing out from a steam generator 4 in the circulation heat exchanger 23. Thus, a temperature of the anode circulating gas F09 is raised.

In this embodiment, an anode recovered gas F07 immediately after flowing out from a water separator 5 is a saturated steam. Meanwhile, the anode circulating gas F09 that has passed through the circulation heat exchanger 23 obtains thermal energy from the anode exhaust gas F06 and turns into a superheated steam. Thus, dew condensation can be prevented from occurring in a pipe extending from the circulation heat exchanger 23 to the ejector 9 in the anode circulating gas line 209. Thus, pulsation in the anode circulating gas F09 flowing through the anode circulating gas line 209 is suppressed. Hence, the fuel cell system 100, which is stable, can be achieved.

In all the embodiments described above, the constituent devices of the fuel cell system 100 are surrounded by a heat insulating material. Thus, heat dissipation from the constituent devices to an outside is suppressed.

In all the embodiments described above, it has been described that all the cathode exhaust gas F04 is supplied to the combustor 3 to turn into the combustion-supporting gas. However, the cathode exhaust gas F04 is not limited thereto. The cathode exhaust gas F04 may be split on an upstream side of the combustor 3 so that a part of the cathode exhaust gas F04 is supplied to the combustor 3 and the remaining cathode exhaust gas heats at least one of the reformer 2 or the oxidant heat exchanger 7. Further, the cathode exhaust gas F04 may be split inside the combustor 3 into a part that is to be combusted together with the recycled combustion gas F08 or the auxiliary combustion fuel F16 and a part that is not to be combusted. Further, the splitting patterns described above may be combined. In this manner, a combustion condition at an appropriate air ratio can be achieved.

In all the embodiments described above, timing at which the operation of the auxiliary heating device 303 is started and timing at which the water pump 8 is operated are not limited to those described above. For example, the auxiliary heating device 303 may be operated based on heat capacities of the fuel cell stack 1, the reformer 2, and the steam generator 4 and temperature rising states of the reformer 2 and the fuel cell stack 1, which are achieved by the combustor 3.

In all the embodiments described above, water can be used as the cooling medium F14 flowing through the heat recovery line 214. However, refrigerant or a heat storage material may be used as the cooling medium F14 as long as thermal energy can be drawn from the anode exhaust gas F06.

In all the embodiments described above, for example, an ion exchange device using an ion exchange resin may be used as the water treatment device 14. However, the water treatment device 14 may use a permeable membrane or may be formed only of a filter depending on required specifications. Further, the water treatment device 14 is not required to be installed if it is not necessary.

In all the embodiments described above, the evaporation flow passage 301 is formed in a helical shape so that turns are spaced apart from each other. However, the evaporation flow passage 301 may be formed in a helical shape having turns being in close contact with each other without leaving a gap. In this case, a heat transfer area per unit length in an axial direction of the steam generator 4 is increased. Hence, heat transfer performance of the steam generator 4 is improved.

In all the embodiments described above, a condensation temperature of the anode exhaust gas F06 in the water separator 5 is about 60° ° C. However, the condensation temperature of the anode exhaust gas F06 in the water separator 5 is not limited to the above-mentioned temperature and may be a different temperature. However, it is desired that the condensation temperature of the anode exhaust gas F06 in the water separator 5 be set so that the amount of condensate water generated from the anode exhaust gas F06 per time in the water separator 5 becomes equal to or larger than the flow rate of the circulating water F10. In this case, after the activation of the fuel cell system 100, water is not required to be supplied to the fuel cell system 100 from the outside. Thus, water can be self-sustaining in the fuel cell system 100, and operating cost of the fuel cell system can be reduced.

The embodiments and the modification examples described above can be carried out in combination.

REFERENCE SIGNS LIST 1 fuel cell stack, 1a anode, 1c cathode, 1e electrolyte, 2 reformer (reforming part), 3 combustor, 4 steam generator, 4a center axis, 4b outer peripheral wall (flow passage wall), 4b1 inner wall surface, 4c inner peripheral wall, 4d partition wall, 4e upper wall, 4f lower wall, 5 water separator, 6 water pipe, 7 oxidant heat exchanger, 8 water pump, 9 ejector, 10 heat recovery cooler, 14 water treatment device, 18 air blower, 19 raw-material pretreatment device, 20 steam temperature sensor, 21 anode exhaust gas temperature sensor, 22 stack temperature sensor, 23 circulation heat exchanger, 24 reformer temperature sensor, 41 outer peripheral space, 42 inner peripheral space, 50 auxiliary combustor, 90 control unit, 100 fuel cell system, 200 raw material line, 201 reforming raw material line, 202 fuel gas line, 203 oxidant line, 204 cathode exhaust gas line, 205 reformed gas line, 206 anode exhaust gas line, 207 anode recovered gas line, 208 recycled combustion gas line, 209 anode circulating gas line, 210 circulating water line, 211 steam line, 214 heat recovery line, 215 combustion exhaust gas line, 216 auxiliary combustion fuel line, 217 auxiliary combustion fuel line, 218 auxiliary combustion fuel line, 221 recovery branch portion, 301 evaporation flow passage, 301a heat transfer pipe, 301b evaporation flow passage inlet, 301c evaporation flow passage outlet, 302 anode exhaust gas flow passage, 303 auxiliary heating device, 304 dew condensation water storage space, 305 dew condensation water discharge pipe, 305a dew condensation water discharge valve, 306 heat transfer promoting member, 307 anode exhaust flow passage inlet, 307a inflow pipe, 307a1 end surface, 308 anode exhaust gas flow passage outlet, 308a outflow pipe, 311 recycled combustion gas flow rate control valve (interrupting portion), 312 recycled combustion gas flow meter, 313 dew condensation water guiding plate, 313a one end portion, 313b the other end portion, 313c through hole, 314 combustion exhaust gas flow passage, 315 partition wall, 316 first flow passage member, 316a groove, 317 second flow passage member, F00 raw material, F01 raw material, F02 fuel gas, F03 oxidant, F04 cathode exhaust gas, F05 reformed gas, F06 anode exhaust gas, F07 anode recovered gas, F08 recycled combustion gas, F09 anode circulating gas, F10 circulating water (water), F11 steam, F14 cooling medium, F15 combustion exhaust gas, F16 auxiliary combustion fuel, F17 auxiliary combustion fuel, F18 auxiliary combustion fuel.

The invention claimed is:

1. A fuel cell system, comprising:
a steam generator configured to heat water to generate steam;
a reformer configured to cause a reaction between the steam and hydrocarbon to generate a reformed gas containing hydrogen;
a fuel cell stack, which has an anode and a cathode, and is configured to generate electric energy through an electrochemical reaction caused between the reformed gas supplied to the anode and an oxidant supplied to the cathode; and
an ejector configured to supply at least one of a raw material containing the hydrocarbon or an anode circulating gas obtained by recovering a part of an anode exhaust gas discharged from the anode, to the reformer by using the steam as a driving fluid,
wherein the steam generator includes:
an evaporation flow passage through which the water flows;
an anode exhaust gas flow passage that is thermally connected to the evaporation flow passage and through which the anode exhaust gas flows; and
an auxiliary heating device configured to heat the water,
wherein an evaporation flow passage inlet through which the water flows into the evaporation flow passage and an evaporation flow passage outlet through which the steam flows out from the evaporation flow passage are arranged so as to be separate from each other in a vertical direction,
wherein an anode exhaust gas flow passage inlet through which the anode exhaust gas flows into the anode exhaust gas flow passage and an anode exhaust gas flow passage outlet through which the anode exhaust gas flows out from the anode exhaust gas flow passage are arranged so as to be separate from each other in the vertical direction, and
wherein the anode exhaust gas flow passage and the auxiliary heating device are opposed to each other across the evaporation flow passage.

2. The fuel cell system according to claim 1,
wherein the evaporation flow passage extends obliquely with respect to an up-and-down direction, and
wherein the evaporation flow passage has a down gradient from an upstream side toward a downstream side.

3. The fuel cell system according to claim 1,
wherein the anode exhaust gas flow passage extends in an up-and-down direction,
wherein the steam generator includes:
a flow passage wall that extends in the up-and-down direction and defines the anode exhaust gas flow passage;
an inflow pipe that penetrates the flow passage wall and is connected to the anode exhaust gas flow passage and into which the anode exhaust gas flows; and
an outflow pipe that is connected to the anode exhaust gas flow passage at a position above the inflow pipe and from which the anode exhaust gas flows out, and
wherein a dew condensation water storage space configured to store dew condensation water is defined below the inflow pipe in the anode exhaust gas flow passage.

4. The fuel cell system according to claim 3,
wherein the inflow pipe has an end surface that faces the anode exhaust gas flow passage, and
wherein the end surface protrudes into the anode exhaust gas flow passage with respect to an inner wall surface of the flow passage wall.

5. The fuel cell system according to claim 3, wherein a dew condensation water guiding plate configured to guide dew condensation water is provided above the inflow pipe in the anode exhaust gas flow passage.

6. The fuel cell system according to claim 1, wherein the auxiliary heating device includes an electric heater.

7. The fuel cell system according to claim 1, wherein the auxiliary heating device includes an auxiliary combustor and a combustion exhaust gas flow passage through which a combustion exhaust gas generated in the auxiliary combustor flows.

8. The fuel cell system according to claim 1, further comprising:
an anode exhaust gas temperature sensor configured to detect a temperature of the anode exhaust gas; and
a controller,
wherein the controller is configured to control the auxiliary heating device based on the temperature of the anode exhaust gas.

9. The fuel cell system according to claim 1, further comprising:
a steam temperature sensor configured to detect a temperature of the steam; and
a controller,
wherein the controller is configured to control the auxiliary heating device based on the temperature of the steam.

10. The fuel cell system according to claim 8, further comprising a stack temperature sensor configured to detect a temperature of the fuel cell stack, wherein, when the fuel cell system is activated, the controller controls the auxiliary heating device so that supply of the steam to the reformer is started within a specific period, and wherein the specific period is a period after the temperature of the fuel cell stack rises to a first temperature and before the temperature of the fuel cell stack rises to a second temperature that is higher than the first temperature.

11. The fuel cell system according to claim 1, further comprising:

a stack temperature sensor configured to detect a temperature of the fuel cell stack; and a controller, wherein, when the fuel cell system is activated, the controller controls the auxiliary heating device so that supply of the steam to the reformer is started within a specific period, and wherein the specific period is a period after the temperature of the fuel cell stack rises to a first temperature and before the temperature of the fuel cell stack rises to a second temperature that is higher than the first temperature.

12. The fuel cell system according to claim 10, wherein the first temperature is 150° C., and the second temperature is 300° C.

13. The fuel cell system according to claim 10, further comprising:

a water separator configured to separate the anode exhaust gas into condensate water and an anode recovered gas;

a recovery branch portion configured to split the anode recovered gas into a recycled combustion gas to be supplied to a combustor that is thermally connected to the reforming part reformer, and the anode circulating gas; and an interrupting valve configured to interrupt supply of the recycled combustion gas to the combustor, wherein, when the fuel cell system is stopped, the controller stops generation of the electric energy in the fuel cell stack, closes the interrupting valve, controls the auxiliary heating device to ensure a flow rate of the steam, and decreases a temperature of the reformer and a temperature of the fuel cell stack.

14. The fuel cell system according to claim 13, wherein, after the temperature of the fuel cell stack decreases to the second temperature, the controller opens the interrupting portion valve.

15. The fuel cell system according to claim 13, wherein, after the temperature of the fuel cell stack decreases to the second temperature, the controller introduces the oxidant or the raw material into an anode line that passes through the reformer and the anode.

16. A fuel cell system, comprising:

a steam generator configured to heat water to generate steam;

a reformer configured to cause a reaction between the steam and hydrocarbon to generate a reformed gas containing hydrogen;

a fuel cell stack, which has an anode and a cathode, and is configured to generate electric energy through an electrochemical reaction caused between the reformed gas supplied to the anode and an oxidant supplied to the cathode; and an ejector configured to supply at least one of a raw material containing the hydrocarbon or an anode circulating gas obtained by recovering a part of an anode exhaust gas discharged from the anode, to the reformer by using the steam as a driving fluid, wherein the steam generator includes:

an evaporation flow passage through which the water flows;

an anode exhaust gas flow passage that is thermally connected to the evaporation flow passage and through which the anode exhaust gas flows; and an auxiliary heating device configured to heat the water, wherein the anode exhaust gas flow passage and the auxiliary heating device are opposed to each other across the evaporation flow passage, wherein the anode exhaust gas flow passage extends in an up-and-down direction, wherein the steam generator includes:

a flow passage wall that extends in the up-and-down direction and defines the anode exhaust gas flow passage;

an inflow pipe that penetrates the flow passage wall and is connected to the anode exhaust gas flow passage and into which the anode exhaust gas flows; and an outflow pipe that is connected to the anode exhaust gas flow passage at a position above the inflow pipe and from which the anode exhaust gas flows out, and wherein a dew condensation water storage space configured to store dew condensation water is defined below the inflow pipe in the anode exhaust gas flow passage.

17. A fuel cell system, comprising:

a steam generator configured to heat water to generate steam;

a reformer configured to cause a reaction between the steam and hydrocarbon to generate a reformed gas containing hydrogen;

a fuel cell stack, which has an anode and a cathode, and is configured to generate electric energy through an electrochemical reaction caused between the reformed gas supplied to the anode and an oxidant supplied to the cathode;

an ejector configured to supply at least one of a raw material containing the hydrocarbon or an anode circulating gas obtained by recovering a part of an anode exhaust gas discharged from the anode, to the reformer by using the steam as a driving fluid;

a stack temperature sensor configured to detect a temperature of the fuel cell stack;

a water separator configured to separate the anode exhaust gas into condensate water and an anode recovered gas;

a recovery branch portion configured to split the anode recovered gas into a recycled combustion gas to be supplied to a combustor that is thermally connected to the reformer, and the anode circulating gas;

an interrupting valve configured to interrupt supply of the recycled combustion gas to the combustor; and a controller, wherein the steam generator includes:

an evaporation flow passage through which the water flows;

an anode exhaust gas flow passage that is thermally connected to the evaporation flow passage and through which the anode exhaust gas flows; and an auxiliary heating device configured to heat the water, wherein the anode exhaust gas flow passage and the auxiliary heating device are opposed to each other across the evaporation flow passage, wherein, when the fuel cell system is activated, the controller controls the auxiliary heating device so that supply of the steam to the reformer is started within a specific period, wherein the specific period is a period after the temperature of the fuel cell stack rises to a first temperature and before the temperature of the fuel cell stack rises to a second temperature that is higher than the first temperature, and wherein, when the fuel cell system is stopped, the controller stops generation of the electric energy in the fuel cell stack, closes the interrupting valve, controls the auxiliary heating device to ensure a flow rate of the steam, and decreases a temperature of the reformer and a temperature of the fuel cell stack.

* * * * *